US010134445B2

(12) United States Patent
Oguchi et al.

(10) Patent No.: US 10,134,445 B2
(45) Date of Patent: Nov. 20, 2018

(54) METHOD OF EXTRACTING A POINT FROM FOOTAGE OF A BASEBALL GAME

(71) Applicant: FUJITSU LIMITED, Kawasaki-shi, Kanagawa (JP)

(72) Inventors: Atsushi Oguchi, Kawasaki (JP); Miho Sakai, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 14/954,123

(22) Filed: Nov. 30, 2015

(65) Prior Publication Data

US 2016/0172005 A1 Jun. 16, 2016

(30) Foreign Application Priority Data

Dec. 10, 2014 (JP) ................................. 2014-250152

(51) Int. Cl.
*G11B 27/28* (2006.01)
*G11B 27/034* (2006.01)
(Continued)

(52) U.S. Cl.
CPC .............. *G11B 27/28* (2013.01); *A63F 13/46* (2014.09); *G11B 27/034* (2013.01); *H04N 1/00336* (2013.01)

(58) Field of Classification Search
CPC .... H04N 19/142; H04N 1/32208; G06K 9/52; A63F 13/46
(Continued)

(56) References Cited

U.S. PATENT DOCUMENTS

2003/0034996 A1\* 2/2003 Li ..................... G06F 17/30787
715/719
2003/0182620 A1\* 9/2003 Errico .............. H04N 21/23614
715/202
(Continued)

FOREIGN PATENT DOCUMENTS

JP 2000-261754 A 9/2000
JP 2005-295296 10/2005
(Continued)

OTHER PUBLICATIONS

Korean Office Action dated Oct. 31, 2016 for corresponding Korean Patent Application No. 10-2015-0172668, with English Translation, 8 pages. \*\*\*Please note JP-2007-335984-A and JP-2005-295296-A cited herewith, were previously cited in an IDS filed on Nov. 30, 2015.\*\*\*

(Continued)

*Primary Examiner* — Thai Q Tran
*Assistant Examiner* — Syed Y Hasan
(74) *Attorney, Agent, or Firm* — Fujitsu Patent Center

(57) ABSTRACT

An extraction device includes a processor that executes a procedure. The procedure includes: extracting a point as an end of the turn at bat from footage of a baseball game in which a point representing a start of a turn at bat has been associated with information indicating respective specified outcomes of the turn at bat, the extracted point being subsequent to a cut including a final pitch scene in the turn at bat and being prior to which cuts have transitioned a number of times, the number of times being determined according to an outcome of the turn at bat.

7 Claims, 17 Drawing Sheets

(51) Int. Cl.
*A63F 13/46* (2014.01)
*H04N 1/00* (2006.01)

(58) Field of Classification Search
USPC ............... 386/241; 382/206; 700/91; 725/19
See application file for complete search history.

(56) References Cited

U.S. PATENT DOCUMENTS

2007/0294716 A1* 12/2007 Jeong ............... G06K 9/00711
  725/19
2008/0140232 A1* 6/2008 Lee .................... G06K 9/00718
  700/91
2008/0175486 A1* 7/2008 Yamamoto ......... G06K 9/00711
  382/206

FOREIGN PATENT DOCUMENTS

| JP | 2007-335984 | 12/2007 |
| JP | 2008-5204 A | 1/2008 |
| JP | 2008-176538 | 7/2008 |
| JP | 5010292 B2 | 8/2012 |

OTHER PUBLICATIONS

Korean Office Action dated Jul. 13, 2017 for corresponding Korean Patent Application No. 10-2015-0172668, with English Translation, 9 pages.
Korean Office Action dated Mar. 28, 2018 for corresponding Korean Patent Application No. 10-2015-0172668, with English Translation, 8 pages.
Yaji, Takafumi et al., "An Automatic Summary Generation of Baseball Games by Using Pitching Scene Analysis and Telop Information," The Institure of Electronics, Information and Communications Engineers, Technical Report of IEICE, Nov. 19, 2004, vol. 104, No. 465, pp, 27-30, see JPOA filed herewith and English Abstract.
Japanese Office Action dated May 29, 2018 for corresponding Japanese Patent Application No. 2014-250152, with English Translation, 10 pages.
Japanese Office Action dated Sep. 11, 2018 for corresponding Japanese Patent Application No. 2014-250152, with English Translation, 8 pages. *Please note JP-2008-5204-A, JP-2000-261754 and "Yaji, Takafumi et al., "An Automatic Summary Generation of Baseball Games by Using Pitching Scene Analysis and Telop Information,". . . " cited herewith, were previously cited in an IDS filed on Jun. 29, 2018.*

* cited by examiner

| GAME ID | DATE-TIME | LOCATION | TEAM | ... |
|---|---|---|---|---|
| 5022 | 20XX/XX/XX 18:00~21:30 | *** BALLPARK | TEAM A (BATTING FIRST) TEAM B (BATTING SECOND) | ... |
| ⋮ | ⋮ | ⋮ | ⋮ | ... |

51A

| TURN AT BAT EVENT ID | GAME ID | INNING | BATTING SEQUENCE | BATTER ID | PITCHER ID | TURN AT BAT RESULT |
|---|---|---|---|---|---|---|
| ⋮ | ⋮ | ⋮ | ⋮ | ⋮ | ⋮ | ⋮ |
| 17 | 5022 | TOP OF FOURTH | 8 | 10001 | 12011 | CENTER FRONT HIT |
| 18 | 5022 | TOP OF FOURTH | 9 | 10002 | 12011 | RIGHT FRONT HIT |
| 19 | 5022 | TOP OF FOURTH | 1 | 10003 | 12011 | LEFT FRONT HIT. SCORE 1. |
| ⋮ | ⋮ | ⋮ | ⋮ | ⋮ | ⋮ | ⋮ |

51C

| BATTER ID | PLAYER NAME | TEAM |
|---|---|---|
| 10001 | TAROU YAMADA | TEAM A |
| ⋮ | ⋮ | ⋮ |

51D

| PITCHER ID | PLAYER NAME | TEAM | LEFT/ RIGHT |
|---|---|---|---|
| 12011 | JIROU TANAKA | TEAM B | RIGHT HANDED PITCH |
| ⋮ | ⋮ | ⋮ | ⋮ |

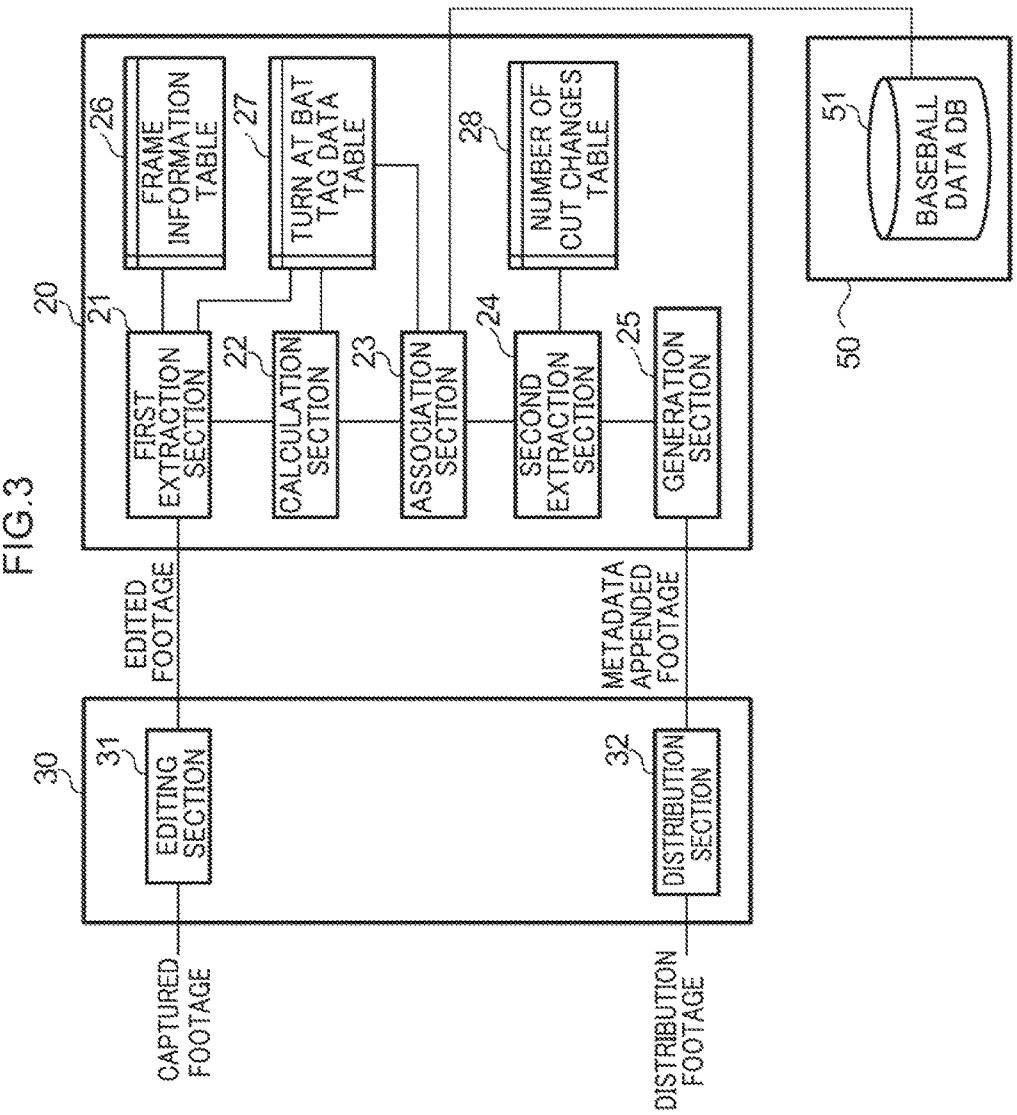

FIG.7

| FRAME TIME (S) | COMPOSITION DETERMINATION | BALL | STRIKE | OUT | RUNNER | SCORE (BATTING FIRST) | SCORE (BATTING SECOND) | INNING | PITCH TAG | TURN AT BAT TAG |
|---|---|---|---|---|---|---|---|---|---|---|
| ... | ... | ... | ... | ... | ... | ... | ... | ... | ... | ... |
| 128.1 |  | 0 | 0 | 1 | 1,2 | 1 | 1 | TOP OF 4TH |  |  |
| 128.2 |  | 0 | 0 | 1 | 1,2 | 1 | 1 | TOP OF 4TH |  |  |
| 128.3 | TRUE | 0 | 0 | 2 | 1,2 | 1 | 1 | TOP OF 4TH | START | START |
| 128.4 | TRUE | 0 | 0 | 2 | 1,2 | 1 | 1 | TOP OF 4TH |  |  |
| 128.5 | TRUE | 0 | 0 | 2 | 1,2 | 1 | 1 | TOP OF 4TH |  |  |
| ... | TRUE | ... | ... | ... | ... | ... | ... | ... | ... | ... |
| 129.7 | TRUE | 0 | 0 | 2 | 1,2 | 1 | 1 | TOP OF 4TH |  |  |
| 129.8 | TRUE | 0 | 1 | 2 | 1,2 | 1 | 1 | TOP OF 4TH |  |  |
| 130.0 | TRUE | 0 | 1 | 2 | 1,2 | 1 | 1 | TOP OF 4TH |  |  |
| 130.1 |  | 0 | 1 | 2 | 1,2 | 1 | 1 | TOP OF 4TH |  |  |
| 130.2 |  | 0 | 1 | 2 | 1,2 | 1 | 1 | TOP OF 4TH |  |  |
| 130.3 |  | 0 | 1 | 2 | 1,2 | 1 | 1 | TOP OF 4TH |  |  |
| 130.4 |  | 0 | 1 | 2 | 1,2 | 1 | 1 | TOP OF 4TH |  |  |
| 130.5 |  | 0 | 1 | 2 | 1,2 | 1 | 1 | TOP OF 4TH |  |  |
| 130.6 |  | 0 | 1 | 2 | 1,2 | 1 | 1 | TOP OF 4TH |  |  |
| 130.7 | TRUE | 0 | 1 | 2 | 1,2 | 1 | 1 | TOP OF 4TH | START |  |
| 130.8 | TRUE | 0 | 1 | 2 | 1,2 | 1 | 1 | TOP OF 4TH |  |  |
| 130.9 | TRUE | 0 | 1 | 2 | 1,2 | 1 | 1 | TOP OF 4TH |  |  |
| 131.0 | TRUE | 0 | 1 | 2 | 1,2 | 1 | 1 | TOP OF 4TH |  |  |
| 131.1 | TRUE | 0 | 1 | 2 | 1,2 | 1 | 1 | TOP OF 4TH |  |  |
| 131.2 | TRUE | 0 | 1 | 2 | 1,2 | 1 | 1 | TOP OF 4TH |  |  |
| 131.3 | TRUE | 0 | 1 | 2 | 1,2 | 1 | 1 | TOP OF 4TH |  |  |
| ... | ... | ... | ... | ... | ... | ... | ... | ... | ... | ... |

FIG.8

| FRAME TIME | INNING | OUT | RUNNERS | SCORE (BATTING FIRST) | SCORE (BATTING SECOND) | LEFT ON BASE (CUMULATIVE) | TURN AT BAT EVENT ID |
|---|---|---|---|---|---|---|---|
| ⋮ | ⋮ | ⋮ | ⋮ | ⋮ | ⋮ | ⋮ | ⋮ |
| 128.3 | TOP OF FOURTH | 2 | 2 (PLAYERS) | 1 | 1 | 5 | 17 |
| 213.6 | TOP OF FOURTH | 2 | 3 (PLAYERS) | 1 | 1 | 5 | 18 |
| 253.2 | TOP OF FOURTH | 2 | 3 (PLAYERS) | 2 | 1 | 5 | 19 |
| ⋮ | ⋮ | ⋮ | ⋮ | ⋮ | ⋮ | ⋮ | ⋮ |

FIG.9

| FRAME TIME | ... | TURN AT BAT EVENT ID |
|---|---|---|
| ⋮ | ... | ⋮ |
| 128.3 | ... | 17 |
| 213.6 | ... | 18 |
| 253.2 | ... | 19 |
| ⋮ | ... | ⋮ |

DATA OF BASEBALL DATA DB 51

← ID: 17, BATTER: TAROU TANAKA, TURN AT BAT RESULT: CENTER FRONT HIT

← ID: 18, BATTER: ICHIROU SATOU, TURN AT BAT RESULT: RIGHT FRONT HIT

← ID: 19, BATTER: SABUROU SUZUKI, TURN AT BAT RESULT: LEFT FRONT HIT, SCORE 1.

FIG.11

| TURN AT BAT OUTCOME | NUMBER OF CUT CHANGES |
|---|---|
| STRIKEOUT | 0 |
| OUT (OTHER THAN STRIKEOUT) | 1 |
| HIT | 2 |

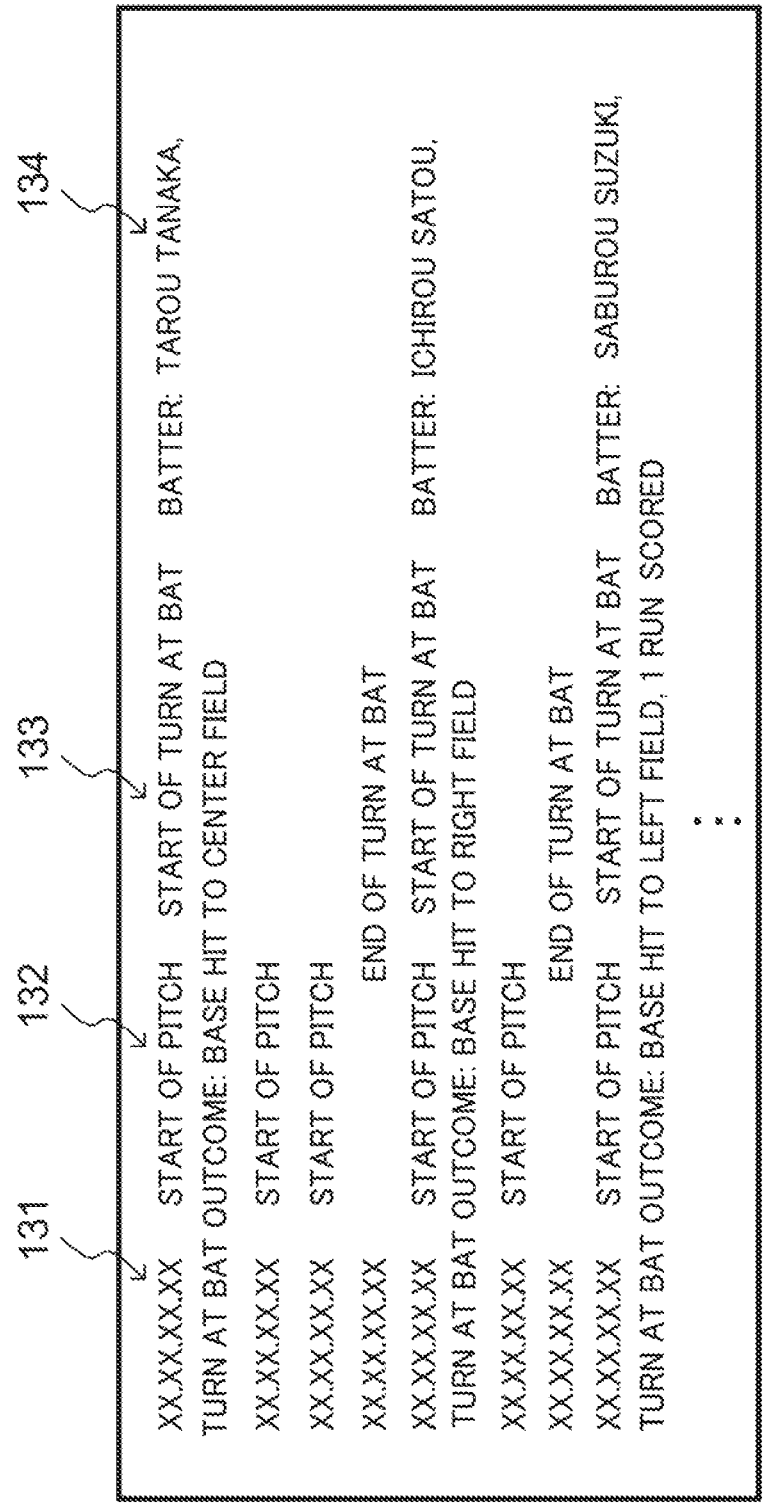

FIG.14

| | | | |
|---|---|---|---|
| 131 | 132 | 133 | 134 |

XX:XX:XX.XX  START OF PITCH  START OF TURN AT BAT  BATTER: TAROU TANAKA,
TURN AT BAT OUTCOME: BASE HIT TO CENTER FIELD
XX:XX:XX.XX  START OF PITCH
XX:XX:XX.XX  START OF PITCH
XX:XX:XX.XX          END OF TURN AT BAT
XX:XX:XX.XX  START OF PITCH  START OF TURN AT BAT  BATTER: ICHIROU SATOU,
TURN AT BAT OUTCOME: BASE HIT TO RIGHT FIELD
XX:XX:XX.XX  START OF PITCH
XX:XX:XX.XX          END OF TURN AT BAT
XX:XX:XX.XX  START OF PITCH  START OF TURN AT BAT  BATTER: SABUROU SUZUKI,
TURN AT BAT OUTCOME: BASE HIT TO LEFT FIELD, 1 RUN SCORED
                    ・・・

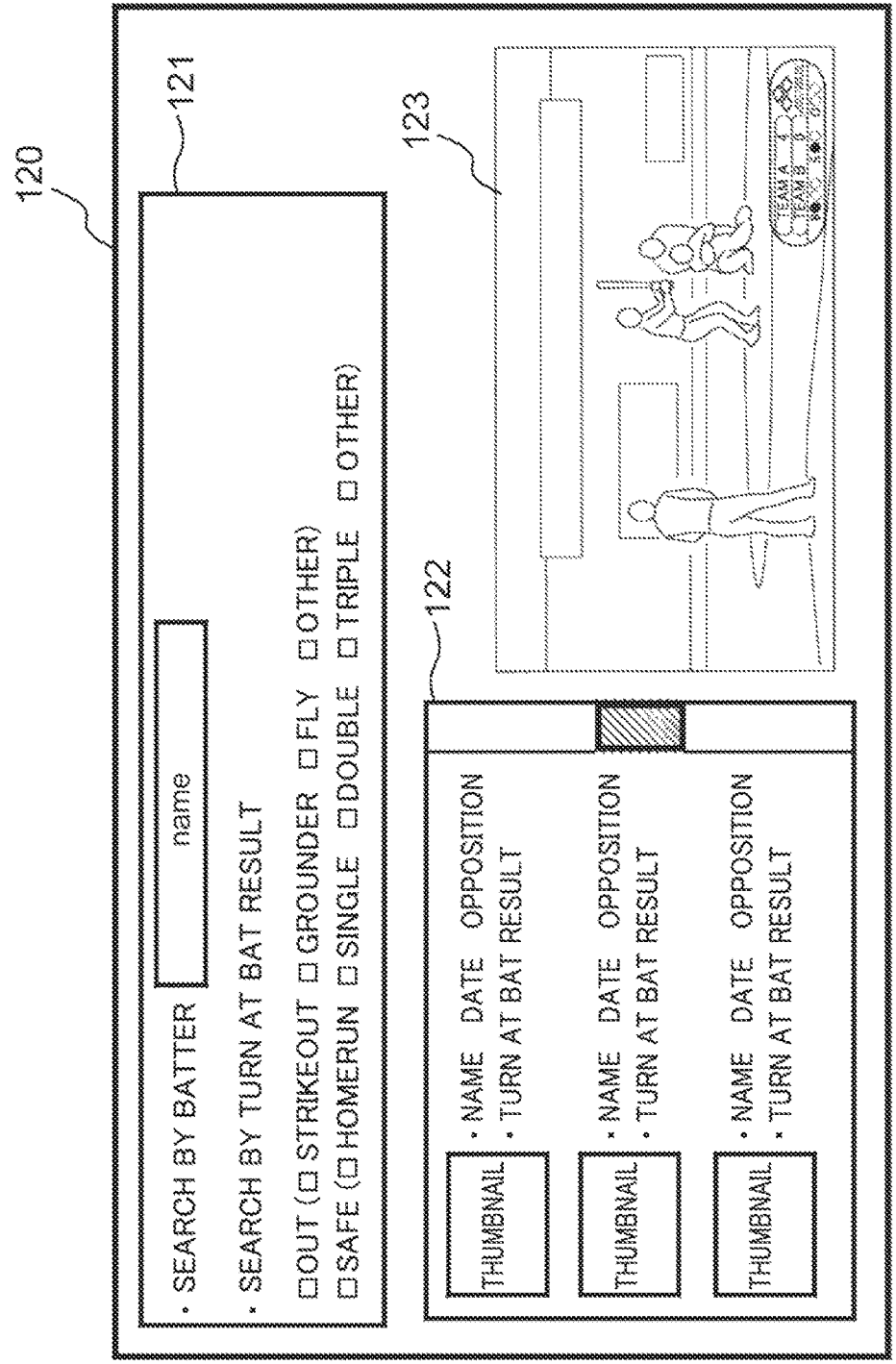

METHOD OF EXTRACTING A POINT FROM FOOTAGE OF A BASEBALL GAME

CROSS-REFERENCE TO RELATED APPLICATION

This application is based upon and claims the benefit of priority of the prior Japanese Patent Application No. 2014-250152, filed on Dec. 10, 2014, the entire contents of which are incorporated herein by reference.

FIELD

The embodiments discussed herein are related to a recording medium storing an extraction program, an extraction method, and an extraction device.

BACKGROUND

Hitherto, extraction has been performed for specific scenes included in footage of sports coverage. For example, a device has been proposed for extracting event end points in sports footage for use in digest viewing. In this device, in sports footage with a fixed event start point, cut points are detected from the event start point onward, and types of cut-length between the detected cut points are classified according to the length of the cut-length. Appearance patterns of cut-length types are associated with event end points, and stored in an appearance pattern storage section. Then, an event end point corresponding to the appearance pattern for the classified types is extracted by referencing the appearance pattern storage section, and the extracted event end point is output.

RELATED PATENT DOCUMENTS

Japanese Laid-Open Patent Publication No. 2007-335984

SUMMARY

According to an aspect of the embodiments, a non-transitory computer-readable recording medium stores an extraction program that causes a computer to execute a process. The process includes, extracting a point as an end of the turn at bat from footage of a baseball game in which a point representing a start of a turn at bat has been associated with information indicating respective specified outcomes of the turn at bat, the extracted point being subsequent to a cut including a final pitch scene in the turn at bat and being prior to which cuts have transitioned a number of times, the number of times being determined according to an outcome of the turn at bat.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of a baseball data database (DB);

FIG. 3 is a functional block diagram of an extraction device and a distribution device according to the exemplary embodiment;

FIG. 7 is a diagram illustrating an example of a frame information table;

FIG. 8 is a diagram illustrating an example of a turn at bat tag data table;

FIG. 9 is a diagram for explaining associating data of a baseball data DB with each frame in edited footage;

FIG. 11 is a diagram illustrating an example of a number of cut changes table;

FIG. 14 is a diagram illustrating an example of a metadata file;

FIG. 15 is a diagram illustrating an example of a distribution screen;

DESCRIPTION OF EMBODIMENTS

An example of an exemplary embodiment according to the technology disclosed herein is explained in detail below with reference to the drawings. In the present exemplary embodiment, explanation is given regarding an example of an extraction device according to the technology disclosed herein applied to a footage distribution system.

Figure 1:
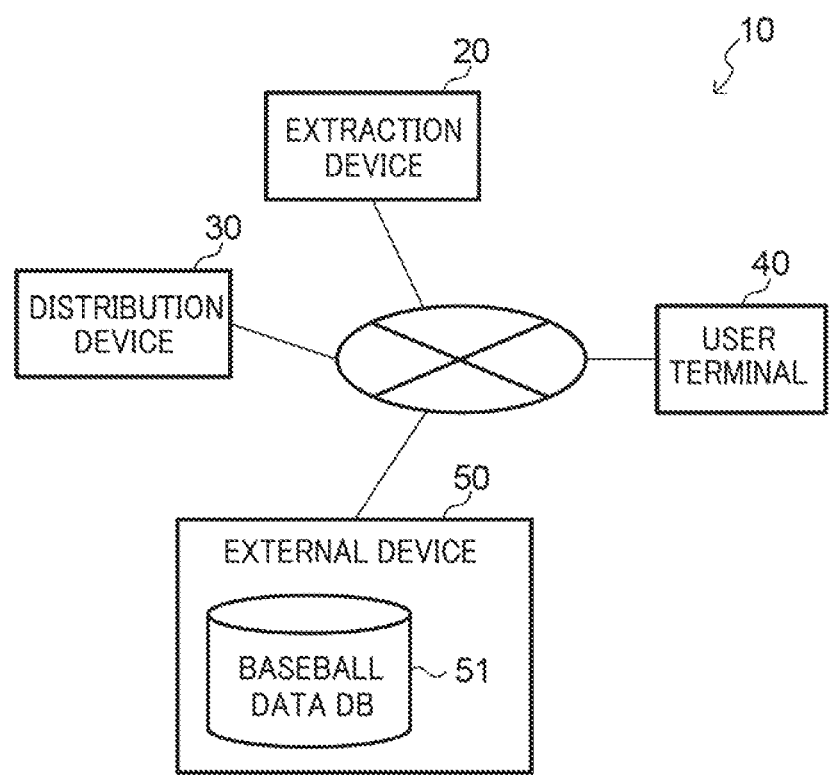
FIG. 1 is a block diagram illustrating a schematic configuration of a footage distribution system according to an exemplary embodiment.

As illustrated in FIG. 1, a footage distribution system 10 according to the present exemplary embodiment includes an extraction device 20, a distribution device 30, a user terminal 40, and an external device 50. The extraction device 20, the distribution device 30, the user terminal 40, and the external device 50 are connected to one another through a network.

The user terminal 40 is a device provided with a display section that displays footage, and an input section to which information is input, and the user terminal 40 is, for example, a personal computer (PC), a notebook PC, a tablet terminal, or a smartphone. Although only one user terminal 40 is illustrated in FIG. 1, there may be plural user terminals.

A baseball data database (DB) 51 recording various data related to baseball games is stored in the external device 50. An example of the baseball data DB 51 is illustrated in FIG. 2. In the example of FIG. 2, the baseball data DB 51 includes a turn at bat data table 51A, a game data table 51B, a batter data table 51C, and a pitcher data table 51D.

In the example of FIG. 2, the turn at bat data table 51A records a "game ID", an "inning", a "batting sequence", a "batter ID", a "pitcher ID", and a "turn at bat result" item associated with a "turn at bat event ID", this being identification information for identifying the respective turn at bat. Each record (each row) in the turn at bat data table 51A corresponds to data for a single turn at bat. The "turn at bat event ID" is a serial number appended to each turn at bat of each team and each game, from the start of the game onward.

The "game ID" is identification information for identifying the game that includes the turn at bat. The "inning" is information indicating to which inning time the turn at bat corresponds. The "batting sequence" is information indicating where the turn at bat is in the batting sequence, from first to ninth. The "batter ID" is identification information for identifying the batter of the turn at bat. The "pitcher ID" is identification information for identifying the pitcher of the opposing team of the turn at bat. The "turn at bat result" is information indicating the final result of the turn at bat in detail.

Information corresponding to the "game ID" of the turn at bat data table 51A is recorded in the game data table 51B. In the example of FIG. 2, items such as the "game ID", "date-time", "location", and "teams" are included in the game data table 51B. The "date-time" is the date and time that the game was played, and the "location" is the name of the ballpark or the like where the game was played. The "teams" is information indicating the teams competing in the game, distinguishing between the first team to bat and the second team to bat.

Information corresponding to the "batter ID" of the turn at bat data table 51A is recorded in the batter data table 51C. In the example of FIG. 2, the batter data table 51C includes the "batter ID", "player name", and "team" items. The "player name" is information indicating the name of the batter identified by the batter ID. The "team" is information indicating the team that the batter identified by the batter ID belongs to.

Information corresponding to the "pitcher ID" of the turn at bat data table 51A is recorded in the pitcher data table 51D. In the example of FIG. 2, the pitcher data table 51D includes the "pitcher ID", "player name", "team", and "left/right" items. The "player name" is information indicating the name of the pitcher identified by the pitcher ID. The "team" is information indicating the team that the pitcher identified by the pitcher ID belongs to. The "left/right" is information indicating whether the pitcher identified by the pitcher ID pitches left handed (left handed throw) or pitches right handed (right handed throw).

The tables included in the baseball data DB 51, and the items included in each of the tables are not limited to the example illustrated in FIG. 2, and may include other information. Moreover, there is no limitation to the data structure illustrated in the example of FIG. 2, and it is sufficient that data for each turn at bat is data recorded in a state enabling identification of the sequence number of the turn at bat.

In the footage distribution system 10, the extraction device 20 appends metadata indicating the start and end of a turn at bat, and metadata associated with each turn at bat in the data of the baseball data DB 51 stored in the external device 50, to footage of a baseball game. The metadata-appended footage is then distributed to the user terminal 40 through the distribution device 30 and the network. As illustrated in FIG. 3, the extraction device 20 includes a first extraction section 21, a calculation section 22, an association section 23, a second extraction section 24, and a generation section 25. The distribution device 30 includes an editing section 31 and a distribution section 32.

First, detailed explanation is given regarding individual sections of the distribution device 30.

The editing section 31 acquires footage of a baseball game (referred to as "captured footage" hereafter). The captured footage is footage captured at a frame rate such as 30 fps, or 60 fps, and includes plural frames. Each frame is associated with a frame time indicating an elapsed time since the start of capture of the captured footage. In the present exemplary embodiment, frame times are employed as identification information of frames.

Figure 4:
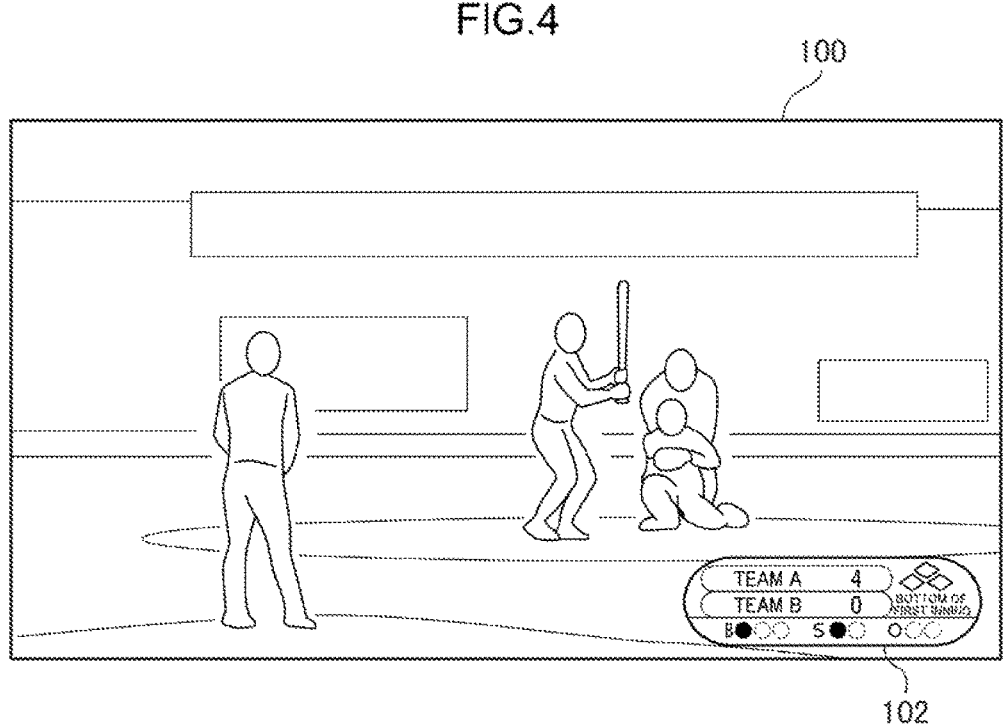
FIG. 4 is a diagram for explaining an example of a pitching composition frame and editing.

The editing section 31 applies editing commands, designated by operation of an operator using a display device and input device, not illustrated in the drawings, to the captured footage using image processing. As illustrated in FIG. 4, for example, the editing commands include adding a count display 102 that displays the game situation to each frame 100 corresponding to specified scenes in the captured footage.

Figure 5:
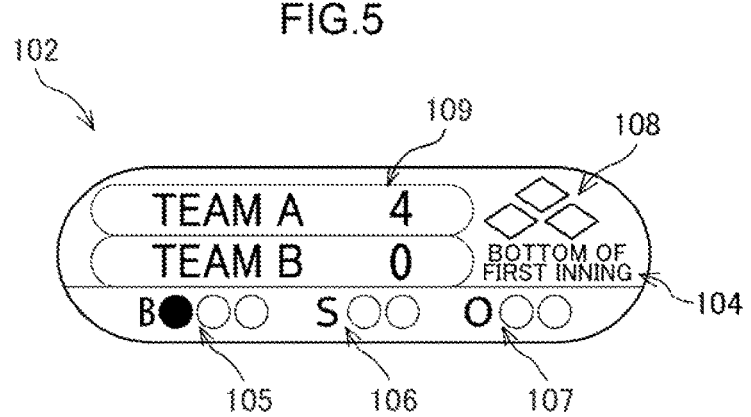
FIG. 5 is a diagram illustrating an example of a count display.

The count display 102 is a display that displays count information including an inning, a ball count, a strike count, an out count, a runner situation, and the current score for each team. For example, as illustrated in FIG. 5, the count display 102 includes an inning display 104 that displays the inning, a ball count display 105 that displays the ball count, and a strike count display 106 that displays the strike count. The count display 102 also includes an out count display 107 that displays the out count, a runner display 108 that displays the runner situation, and a score display 109 that displays the current score for each team. Note that the format of the count display 102 is not limited to the example in FIG. 5; any display displaying count information for at least the inning, out count, runner situation, and current score for each team is sufficient.

Figure 6:
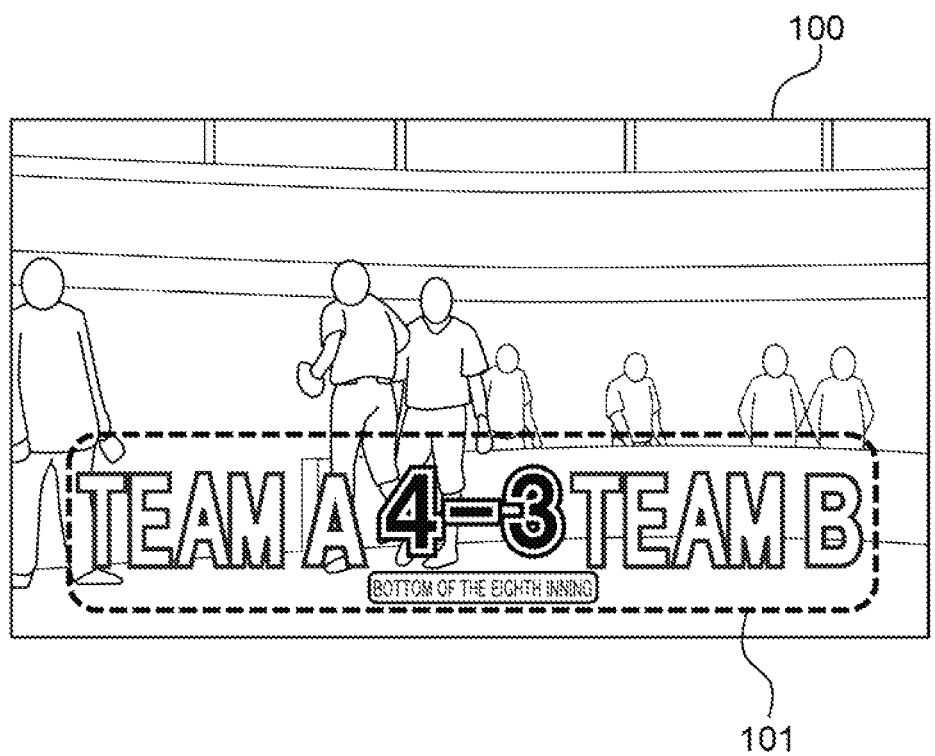
FIG. 6 is a diagram illustrating an example of a score overlay.

The editing section 31 moreover appends a score overlay 101 indicating that run scoring has occurred, such as that illustrated in FIG. 6, to each frame 100 representing a scene in which run scoring occurred.

The editing commands are not limited to adding the count display 102 or the score overlay 101, and may include various content such as adding an overlay displaying player information such as name and profile. Footage that is captured footage that has been edited by the editing section 31 is referred to as "edited footage" hereafter. The editing section 31 transmits the edited footage to the association device 20.

The distribution section 32 acquires footage to which metadata has been added by the association device 20 (referred to as "metadata appended footage" hereafter; detailed explanation is given below). The distribution section 32 converts metadata appended footage to distribution footage according to specified standards, and distributes the distribution footage to a distribution destination user terminal 40.

Next, detailed explanation is given regarding individual sections of the extraction device 20.

The first extraction section 21 acquires edited footage transmitted from the distribution device 30. The first extraction section 21 extracts a frame representing the start of a turn at bat from the edited footage, and appends a turn at bat tag indicating the start of a turn at bat to the edited footage. The extraction of the frame representing the start of the turn at bat may be performed by extracting characteristics from each frame of the edited footage, or may be performed by manual extraction. In the present exemplary embodiment, as an example, explanation is given regarding a case in which the frame representing the start of the turn at bat is extracted based on the composition of each frame and the count display 102, and this frame is appended with the turn at bat tag indicating the start of the turn at bat.

The first extraction section 21 detects from respective plural frames included in the edited footage, a frame having a composition captured at a camera angle used in a pitcher's pitching scene, as a pitching composition frame. In the present exemplary embodiment, explanation follows regarding a case in which the pitching composition frame is a frame having a composition captured in a direction toward the batter from behind the pitcher, as illustrated in FIG. 4.

Specifically, the first extraction section 21 extracts image characteristics for each frame. The image characteristics are characteristics represented by pixel information such as the luminance and color of each pixel inside the frame. The first extraction section 21 derives a similarity value between reference image characteristics extracted from a pre-prepared pitching composition frame, and extracted image characteristics extracted from each frame of the edited footage. The first extraction section 21 extracts as pitching composition frames any frames with extracted image characteristics having a similarity value to the reference image characteristics of a specified value or greater. For example, characteristics representing the composition (configuration) of the image, characteristics representing the placements and distributions of, for example, color and luminance, or characteristics obtained using wavelet transformation may be employed as the image characteristics.

The first extraction section 21 extracts the count display 102 from each frame, and detects count information displayed by the count display 102. For example, the first extraction section 21 extracts the count display 102 from a region within a frame predetermined to be a region displaying the count display 102. Alternatively, the count display 102 is extracted from within the frame by, for example, pattern matching using a predetermined format for the count display 102. The first extraction section 21 then identifies the region of the inning display 104 in the extracted count display 102 using, for example, pattern matching or optical character recognition processing, and detects the inning displayed by the inning display 104. Similarly, the first extraction section 21 detects the ball count form the ball count display 105, and detects the strike count from the strike count display 106. Moreover, the first extraction section 21 detects the out count from the out count display 107, detects the runner situation from the runner display 108, and detects the score from the score display 109.

The first extraction section 21 records the detection results of the pitching composition frames and the count information detected for each of the frames in a frame information table 26. FIG. 7 illustrates an example of the frame information table 26. In the example of FIG. 6, "composition determination", "ball", "strike", "out", "runner", "score (batting first), "score (batting second)", and "inning" items are included for each frame identified by a frame time. The first extraction section 21 records "TRUE" in the "composition determination" item corresponding to frames detected as pitching composition frames. The "composition determination" item is left blank for frames not detected as pitching composition frames. The first extraction section 21 records the ball count, the strike count, the out count, the runner situation, the scores, and the inning detected as count information in the respective corresponding items.

In FIG. 7 the frame time is displayed in 0.1 second divisions in order to simplify explanation. However, in the case of captured footage with a framerate of 30 fps for example, the frame times are in divisions of approximately 0.03 seconds, and in the case of captured footage with a framerate of 60 fps, the frame times are in divisions of approximately 0.017 seconds.

The first extraction section 21 references the frame information table 26 and identifies a group of frames formed from plural consecutive pitching composition frames as a pitching composition scene. The first extraction section 21 determines the start frame of the pitching composition scene as a frame representing the start of a pitch, and appends a pitch tag indicating the start of a pitch to the frame. When the ball count is 0 and the strike count is 0 in the frame representing the start of the pitch, the first extraction section 21 determines that the frame is a frame representing the start of a turn at bat, and appends the turn at bat tag indicating the start of a turn at bat. In the example of FIG. 7, frames having "start" recorded in the "pitch tag" item represent frames appended with the pitch tag indicating the start of a pitch. Frames having "start" recorded in the "turn at bat tag" item represent frames appended with the turn at bat tag indicating the start of a turn at bat.

For example, in the example of FIG. 7, the first extraction section 21 first identifies a scene represented by the group of frames included at frame times of from 128.3 to 130.0 as a pitching composition scene. The first extraction section 21 then determines the frame at frame time=128.3 that is the start frame of the pitching composition scene as a frame representing the start of a pitch. Moreover, since the ball count and the strike count are both 0 in the frame at frame time=128.3, the frame at frame time=128.3 is determined as a frame representing the start of a turn at bat. A scene represented by the group of frames included from frame time=130.7 onward is similarly identified as a pitching composition scene. The first extraction section 21 then determines the frame at frame time=130.7 that is the start frame of the pitching composition scene as a frame representing the start of a pitch. However, the frame at frame time=130.7 has a ball count of 0 and a strike count of 1, and is therefore not determined as a frame representing the start of turn at bat.

The calculation section 22 generates a turn at bat tag data table 27 that has extracted information for calculating the turn at bat sequence number from the frame information table 26. FIG. 7 illustrates an example of the turn at bat tag data table 27. The example of FIG. 7 includes "frame time", "inning", "out", "runner", "score (batting first)", "score (batting second)", "left on base (cumulative)", and the "turn at bat event ID" items. Each record (each row) in the turn at bat tag data table 27 corresponds to tag data related to respective turn at bats divided by turn at bat tags (referred to as "turn at bat tag data" hereafter).

Specifically, the calculation section 22 extracts a frame appended with a turn at bat tag by the first extraction section 21 from the frame information table 26, and records information indicating the frame time, inning, out count, score (batting first), and score (batting second) of the extracted frame in the turn at bat tag data table 27. The calculation section 22 also derives the number of runners from the runner situation recorded in the "runner" item of the frame information table 26, and records the number of runners in the "runner" item of the turn at bat tag data table 27. For example, if the runner situation recorded in the "runner" item of the frame information table 26 indicates that there are runners at first base and second base, "2" is recorded in the "runner" item of the turn at bat tag data table 27.

Moreover, the calculation section 22 records a cumulative value of the number of left on bases in each inning in the "left on base (cumulative)" item. The number left on base in each inning is a cumulative value of the number of players recorded in the "runner" item of the turn at bat tag data with the greatest frame time out of turn at bat tag data recorded with the same value in the "inning" item for each top or bottom of the inning.

Moreover, the calculation section 22 calculates a turn at bat sequence number indicating the sequence in which each turn at bat falls in the game for each team, based on the values recorded in each item out of "inning", "out", "runner", "score (batting first)", "score (batting second)", and "left on base (cumulative)". The calculation section 22 may, for example, calculate the sequence number of the turn at bat according to the equation below.

Sequence number of turn at bat={((numeric value of "inning")−1)×3+"left on base(cumulative)"+1}+ "out"+"runner"+"score"

For the "score", the value of "score (batting first)" is employed for the "top" of the "inning", and value of the "score (batting second)" is employed for the "bottom" of the "inning". The calculation section 22 records the sequence number of the turn at bat calculated for each turn at bat in the "turn at bat event ID" item of the turn at bat tag data table 27.

Note that the method of calculating the sequence number of the turn at bat is not limited to the above, as long as the number of batters having made an appearance up until that turn at bat is calculated. For example, the sequence number of the turn at bat may be calculated according to the equation below.

Sequence number of turn at bat=(sequence number of final turn at bat in previous inning)+"out"+ "runner"+("score"−final "score" in previous inning)

The (sequence number of final turn at bat in previous inning) is the value recorded in the "turn at bat event ID" item of the turn at bat tag data having the greatest frame time out of the turn at bat tag data with the value of the previous inning recorded in the "inning" item. Similarly, the final "score" in the previous inning is the value recorded in the "score" item of the turn at bat tag data having the greatest frame time out of the turn at bat tag data having the value of the previous inning recorded in the "inning" item. The "value of the previous inning" is a value one lower than the value recorded in the "inning" of the turn at bat tag data to be calculated, with the same "top" or "bottom" distinction.

The association section 23 acquires the baseball data DB 51 from the external device 50, and associates (compounds) the baseball data DB 51 and the turn at bat tag data table 27 based on their respective turn at bat event IDs.

As illustrated in FIG. 9, the data of the baseball data DB 51 that is existing external data can thereby be added to the edited footage as the metadata corresponding to each frame of the edited footage. Note that in the present exemplary embodiment, the associated data includes at least information enabling determination of the outcome of the turn at bat and whether or not any runs were scored at that turn at bat, for use by the second extraction section 24, described later. In the example of FIG. 9, the associated turn at bat outcomes are detailed turn at bat outcomes including information about the runs scored in cases in which run scoring occurred at that turn at bat. In the example of FIG. 9, the name of the batter is the player name associated with the "batter ID" of the turn at bat data table 51A of the baseball data DB 51, extracted from the batter data table 51C.

When associating the baseball data DB 51 and the turn at bat tag data table 27, the association section 23 may reference the "inning" information of both the baseball data DB 51 and the turn at bat tag data table 27, and make associations by inning. Associating the baseball data DB 51 and the turn at bat tag data table 27 by inning enables misalignments in the association to be inhibited from affecting subsequent innings when an append error, described below, occurs with a turn at bat tag.

Note that in the present exemplary embodiment, the start of a turn at bat is extracted based on the image characteristics of the frame and the information represented by the count display 102 extracted from the frame, and is appended with the turn at bat tag indicating the start of a turn at bat. Accordingly, sometimes the starts of turns at bat are not completely extractable and appending omissions occur with the turn at bat tags that indicate the start of a turn at bat, or points that are not the start of a turn at bat are extracted as the start of a turn at bat and turn at bat tags indicating the start of a turn at bat are duplicated. Note that such issues are similarly possible in cases in which the turn at bat tags that indicate the start of a turn at bat are appended manually.

Figure 10:
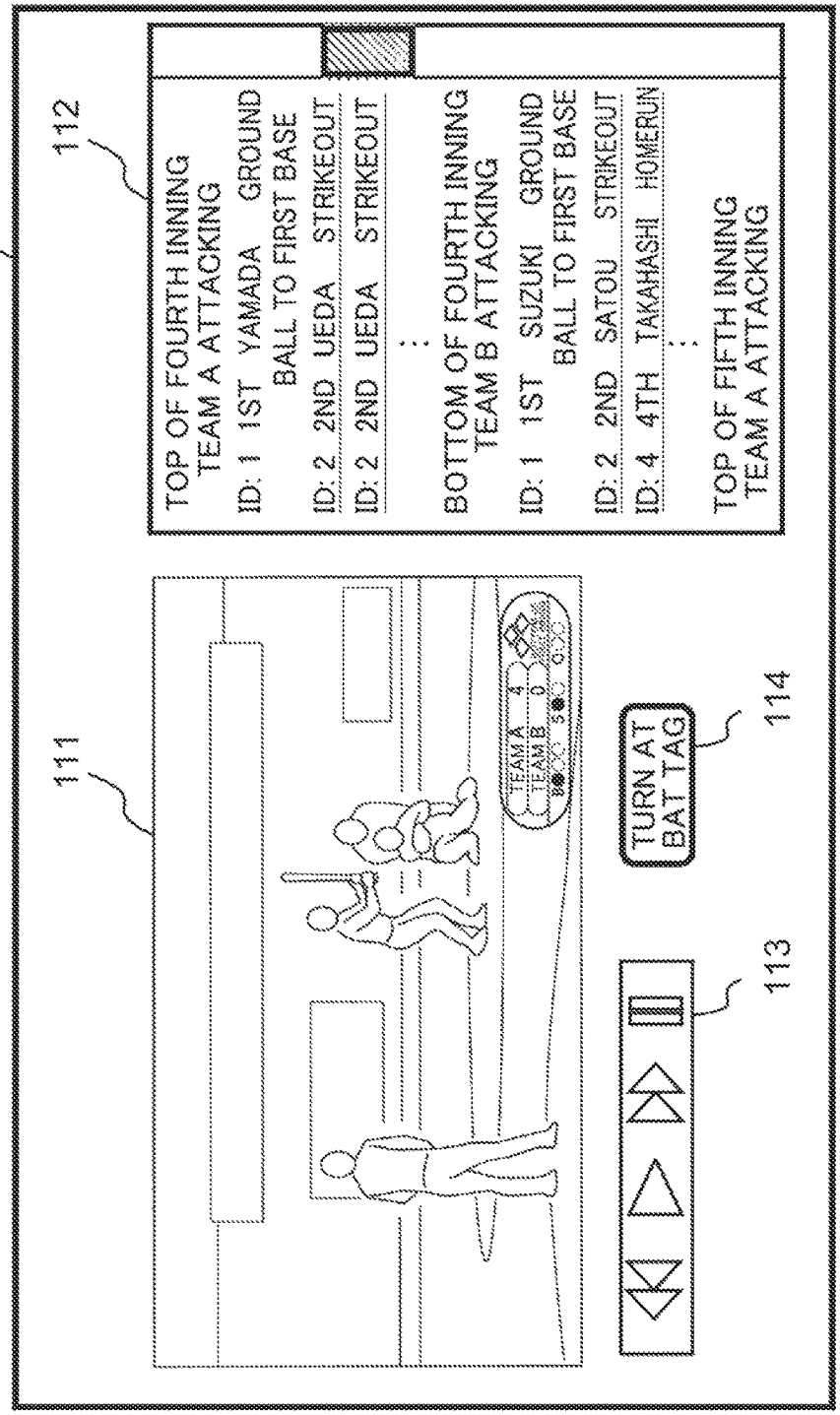
FIG. 10 is a diagram illustrating an example of a correction screen.

The association section 23 presents places where "turn at bat event ID" values have been skipped over or duplicated in the turn at bat tag data table 27 to an operator using a display device provided to the extraction device 20, and prompts turn at bat tag correction. For example, the association section 23 displays a correction screen 110 like that illustrated in FIG. 10 on the display device provided to the extraction device 20. In the example of FIG. 10, the correction screen 110 includes a footage playback region 111 that plays back edited footage, an associated data display region 112, and operation buttons 113 for performing operations such as footage playback, fast-forward, rewind, replaying one frame at a time, and pausing. The correction screen 110 also includes an append turn at bat tag button 114 for appending turn at bat tags to the frame displayed in the footage playback region 111.

Metadata of each turn at bat associated with the edited footage from the baseball data DB 51 is displayed in the associated data display region 112. The metadata displayed in the associated data display region 112 includes at least the turn at bat event ID, and may display other information for easily confirming the turn at bat tag. When data of a respective turn at bat displayed in the associated data display region 112 is selected, the association section 23 acquires the corresponding frame time from the turn at bat tag data table 27. Edited footage from the frame indicated by the acquired frame time onward is when played back in the footage playback region 111.

When displaying metadata in the associated data display region 112, the existence of append errors in the turn at bat tags is presented to the operator by, for example, emphatically displaying turn at bat data having a skipped over or duplicated turn at bat event ID. In the example of FIG. 10, turn at bat event ID=2 (denoted "ID:2" in FIG. 10, and similar applies for other turn at bat event IDs) is duplicated for team A. Moreover, turn at bat event ID=3 is skipped over for team B (the turn at bat event ID increases by 2 or more). In FIG. 10, turn at bats where turn at bat tag append errors are ascertained are displayed emphatically by underlining. Other than underlining as illustrated in FIG. 9, there are various conceivable modified examples of the mode of emphatic display, such as changing the text color, changing the text size, and changing the font.

When a turn at bat event ID is duplicated, it is conceivable that the turn at bat extraction was duplicated as a turn at bat tag append error. Accordingly, when a turn at bat event ID is duplicated, the association section 23 may display on the associated data display region 112 that a turn at bat tag append error due to duplicate extraction of a turn at bat has occurred. Moreover, it is conceivable that a turn at bat extraction omission occurred when the turn at bat event ID increases by 2 or more compared to the previous turn at bat event ID. Accordingly, when the turn at bat event ID increases by 2 or more, the association section 23 may display on the associated data display region 112 that a turn at bat extraction omission has occurred as a turn at bat tag append error. The association section 23 may also determine that a turn at bat tag append error has occurred when the turn at bat event ID decreases compared to the previous turn at bat event ID.

The operator of the extraction device 20, for example, confirms the footage by selecting the corresponding turn at bat data from the associated data display region 112 when the turn at bat event ID is duplicated. The operator erases the turn at bat data corresponding to the turn at bat tag append error from the associated data display region 112. The association section 23 erases the turn at bat tag data corresponding to the turn at bat data erased from the associated data display region 112 from the turn at bat tag data table 27. The turn at bat tag is thereby removed from the frame erroneously appended with a turn at bat tag.

When, for example, a turn at bat event ID is skipped over, the operator of the extraction device 20 confirms the footage by selecting the corresponding prior or subsequent turn at bat from the associated data display region 112. Then, the operator selects the append turn at bat tag button 114 in a state in which the frame representing the start of the turn at bat is displayed on the footage playback region 111. When the append turn at bat tag button 114 is selected, the association section 23 adds the frame time of the frame displayed on the footage playback region 111 to the turn at bat tag data table 27. The association section 23 then references the turn at bat event IDs associated with the prior or subsequent frame times in the turn at bat tag data table 27, and appends the turn at bat event ID to the added frame time.

The association section 23 remakes the associations with the baseball data DB 51 based on the turn at bat tag data table 27 after correction. Data of each turn at bat in the baseball data DB 51 is thereby associated with each frame appended with a turn at bat tag, namely, the frame time of each frame representing the start of a turn at bat, as metadata.

The following modes of association may be made when making associations between the baseball data DB 51 and the turn at bat tag data table 27.

An association is made when a turn at bat event ID in the turn at bat tag data table 27 has increased by 1 compared to the previous turn at bat event ID.

Association processing is stopped when a turn at bat event ID in the turn at bat tag data table 27 has not increased in value by 1 compared to the previous turn at bat event ID.

Examples of cases in which the turn at bat event ID does not increase in value by 1 compared to the previous turn at bat event ID include, as described above, a turn at bat event ID being duplicated, the turn at bat event ID increasing by 2 or more, and the turn at bat event ID decreasing. Stopping of association processing may be stopped for the portion for which the turn at bat event IDs do not increase in value by 1 compared to the previous turn at bat event ID. The association processing may be inhibited at a point in time when a turn at bat event ID that has not increased in value by 1 compared to the previous turn at bat event ID is detected in the association processing. This can thereby inhibit erroneous association processing accompanying an erroneously appended turn at bat event ID.

Adding the metadata to the footage as described above enables, for example, a personal digest compiled of only the turns at bat of a particular player to be created based on the metadata. Specifically, when a particular batter is specified, a frame to which the name or batter ID representing the specified batter has been added as metadata is extracted. Then, a segment from the extracted frame to the frame before the frame appended with the following turn at bat tag, namely a segment demarcated by the turn at bat tag indicating the start of the turn at bat, is extracted as footage of a single turn at bat of the specified batter.

However, when a segment demarcated by the turn at bat tag indicating the start of a turn at bat is extracted as the footage of a single turn at bat as described above, sometimes the footage is too lengthy to view in digest form. For example, cuts showing the batter after the end of their turn at bat, the pitcher, the scene inside the stadium, the grounds, and the scene until the next batter steps up to the plate are often included toward the end of a segment extracted as footage of a single the urn at bat, with these cuts resulting in excessive lengthiness. Note that a "cut" is a continuous section captured successively by a single camera.

Accordingly, in the present exemplary embodiment, when creating a digest in turn at bat units, the second extraction section 24 extracts an appropriate point as the end of the turn at bat, so as to enable a reduction in excessive lengthiness.

Specifically, the second extraction section 24 acquires the turn at bat outcome, and whether or not any runs were scored at that turn at bat, from the metadata representing data for each turn at bat that is associated with the frames appended with the turn at bat tags, namely the frames representing the starts of turns at bat. When no runs were scored at a turn at bat, as the end of that turn at bat, the second extraction section 24 extracts a point that comes after a cut including the final pitch of the turn at bat, and where cuts have transitioned a number of times corresponding to the turn at bat outcome.

More specifically, out of the frames appended with the pitch tag in a segment demarcated by the turn at bat tags, the second extraction section 24 extracts the frame with the highest frame time as a frame representing the start of the final pitch of that turn at bat.

As illustrated in FIG. 11, for example, the second extraction section 24 also acquires a number of cut changes corresponding to the turn at bat outcome acquired from the metadata from a number of cut changes table 28 in which turn at bat outcomes are associated in advance with a number of cut changes. Cut transitions after the final pitch of a turn at bat tend to vary depending on the outcome of that turn at bat. In consideration of this, the numbers of cut changes set out in the number of cut changes table 28 are set out corresponding to turn at bat outcomes so as not to cut off the final part of the footage of a single turn at bat, and also enable a reduction in excessive lengthiness.

Explanation follows regarding an example of the number of cut changes corresponding to the turn at bat outcome. For example, for a turn at bat outcome of strikeout, after the batter has been struck out, a cut including the final pitch of the turn at bat tends to track the batter who was struck out for a short time before transitioning to the following cut. When the turn at bat outcome is a strikeout, it is appropriate to set the point where this cut transitions as the end of the turn at bat, so as not to cut off the turn at bat partway, and to enable a reduction in excessive lengthiness. Since the point where the cut transitions is the point where the cut including the final pitch of the turn at bat transitions to the next cut, the number of cut changes after the cut including the final pitch of the turn at bat is "0". Accordingly, the number of cut changes table 28 sets out a number of cut changes of "0 times" associated with the turn at bat outcome "strikeout".

A turn at bat outcome of an out other than a strikeout (an infield grounder, an outfield fly, or the like) transitions to a cut tracking the struck ball after the final pitch of the turn at bat has been batted. The cut tracking the struck ball tends to continue until a fielder fields the ball in the case of a fly hit, and until a fielder fields the ball and throws the ball to one of the bases in the case of a grounder, and then transition to the next cut. When the turn at bat outcome is an out other than a strikeout, it is appropriate to set the point of the transition from the cut tracking the struck ball as the end of the turn at bat. As described above, for example, the point of the transition from the cut tracking the struck ball is often the transition point of the first cut after the cut including the final pitch of the turn at bat. Accordingly, the number of cut changes table 28 sets out a number of cut changes of "1 time" associated with the turn at bat outcome "out (other than strikeout)".

A turn at bat outcome of a hit transitions to a cut tracking the struck ball after the final pitch of the turn at bat has been batted, and then transitions to a cut tracking the runner. The cut tracking the runner tends to continue until the runner reaches one of the bases, and then transition to the next cut. When the turn at bat outcome is a hit, it is appropriate to set the point of the transition from the cut tracking the runner as the end of the turn at bat. As described above, for example, the point of the transition from the cut tracking the runner is often the point where the second cut after the cut including the final pitch of the turn at bat transitions. Accordingly, the number of cut changes table 28 sets out a number of cut changes of "2 times" associated with the turn at bat outcome "hit".

Note that the numbers of cut changes above are examples, and the numbers of cut changes corresponding to the turn at bat outcome may be set in consideration of what degree lengthiness to allow when creating a digest in turn at bat units, and characteristics of the cut breaks in the captured footage. The categories of turn at bat outcomes are also not limited to the examples above, and the number of cut changes may be set out according to more precisely categorized types of out and hit. For example, "2 times" may be set out for singles, "3 times" may be set out for doubles, and "4 times" may be set out for triples.

In cases in which the level of categorization differs between the turn at bat outcomes appended by metadata and the turn at bat outcomes set out in the number of cut changes table 28, rules are defined for converting the turn at bat outcomes appended by metadata into the turn at bat outcomes set out in the number of cut changes table 28. The second extraction section 24 may moreover acquire numbers of cut changes corresponding to turn at bat outcomes that have been converted from the turn at bat outcomes appended by metadata according to these rules from the number of cut changes table 28. For example, in cases in which the turn at bat outcomes appended by metadata are detailed turn at bat outcomes such as "base hit to center field", and "grounder to second", rules may be defined to convert "base hit to center field" to "hit", "grounder to second" as "out", and so on.

On acquiring the number of cut changes, the second extraction section 24 detects the frames where the cuts transition in sequence following the frame representing the start of the final pitch of the turn at bat. The cut transitions may, for example, be detected employing a known method, such as detecting a point where the difference between pixel information such as luminance and color information between consecutive frames is a specific threshold value or greater. The second extraction section 24 sets the earliest detected cut transition as the point where the cut including the final pitch of the turn at bat transitions to the next cut, and detects cut transition points for the acquired number of cut changes from this point onward. The second extraction section 24 extracts the last frame of the cut prior to the final detected transition point as the frame representing the end of the turn at bat. Note that in cases in which the number of cut changes is 0 times, the last frame of the cut including the final pitch of the turn at bat is extracted as the frame representing the end of the turn at bat.

Note that there is no limitation to detecting the transition point of the cut corresponding to the frame representing the end of the turn at bat in sequence from the frame representing the start of the final pitch of the turn at bat. The frame representing the end of the turn at bat may be extracted by detecting all cut transition points in advance, and from these, selecting the cut transition point corresponding to the number of cut changes as described above.

More specifically, all the cut changes in a segment demarcated by a turn at bat tag were to be detected, and the transition point between the cut including the final pitch of the turn at bat and the next cut is set as "number 0". Out of the detected cut changes, the cut transition with the number of the acquired number of cut changes may then be extracted as the end of the turn at bat.

Figure 12:
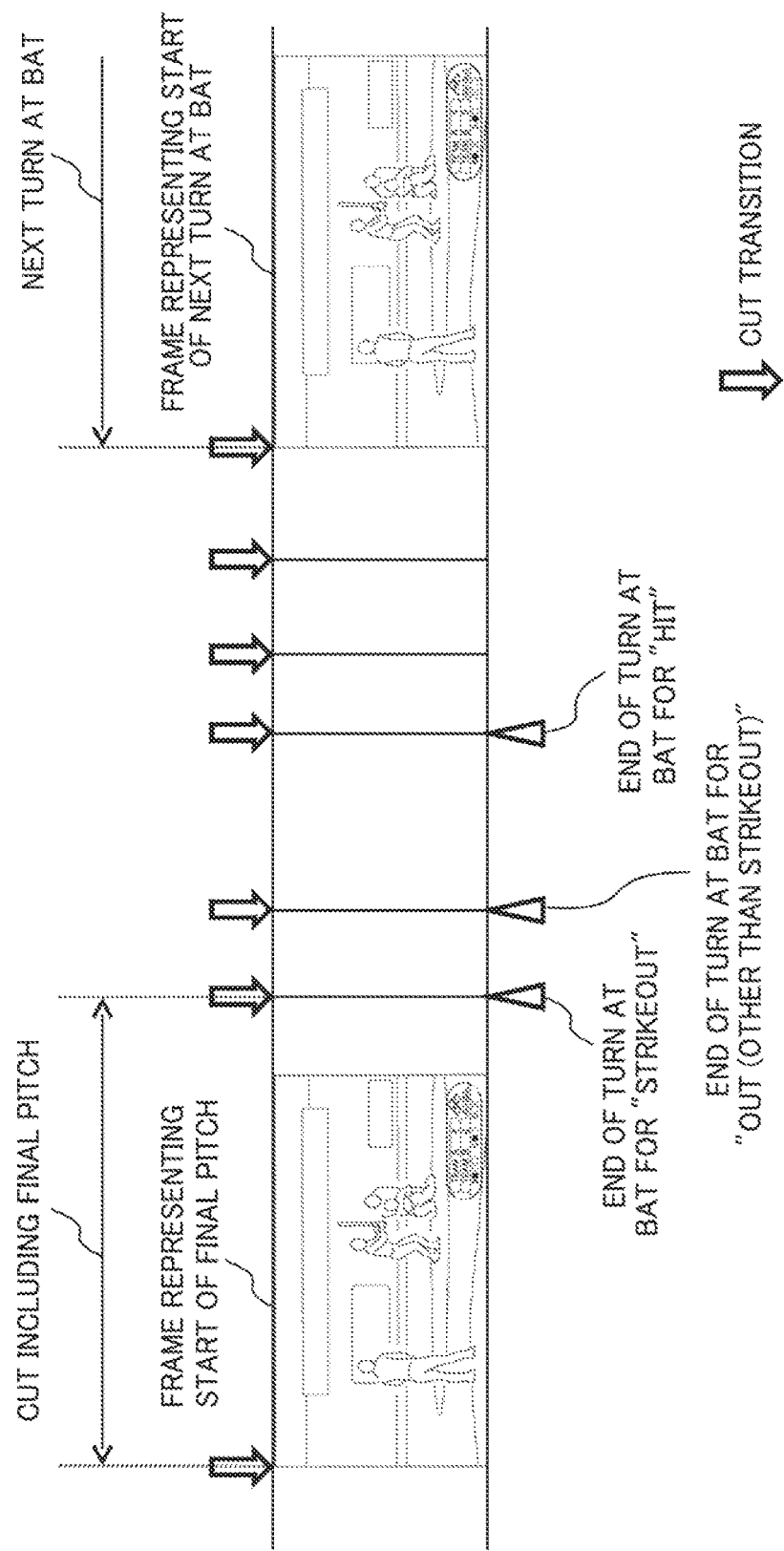
FIG. 12 is a diagram illustrating examples of extraction of the end of a turn at bat.

FIG. 12 illustrates examples of extraction of the end of a turn at bat using the number of cut changes table 28 illustrated in FIG. 11. It is clear that it is possible to reduce excessive lengthiness in comparison to cases in which the frame before the start of the next turn at bat is extracted as the end of the previous turn at bat.

Figure 13:
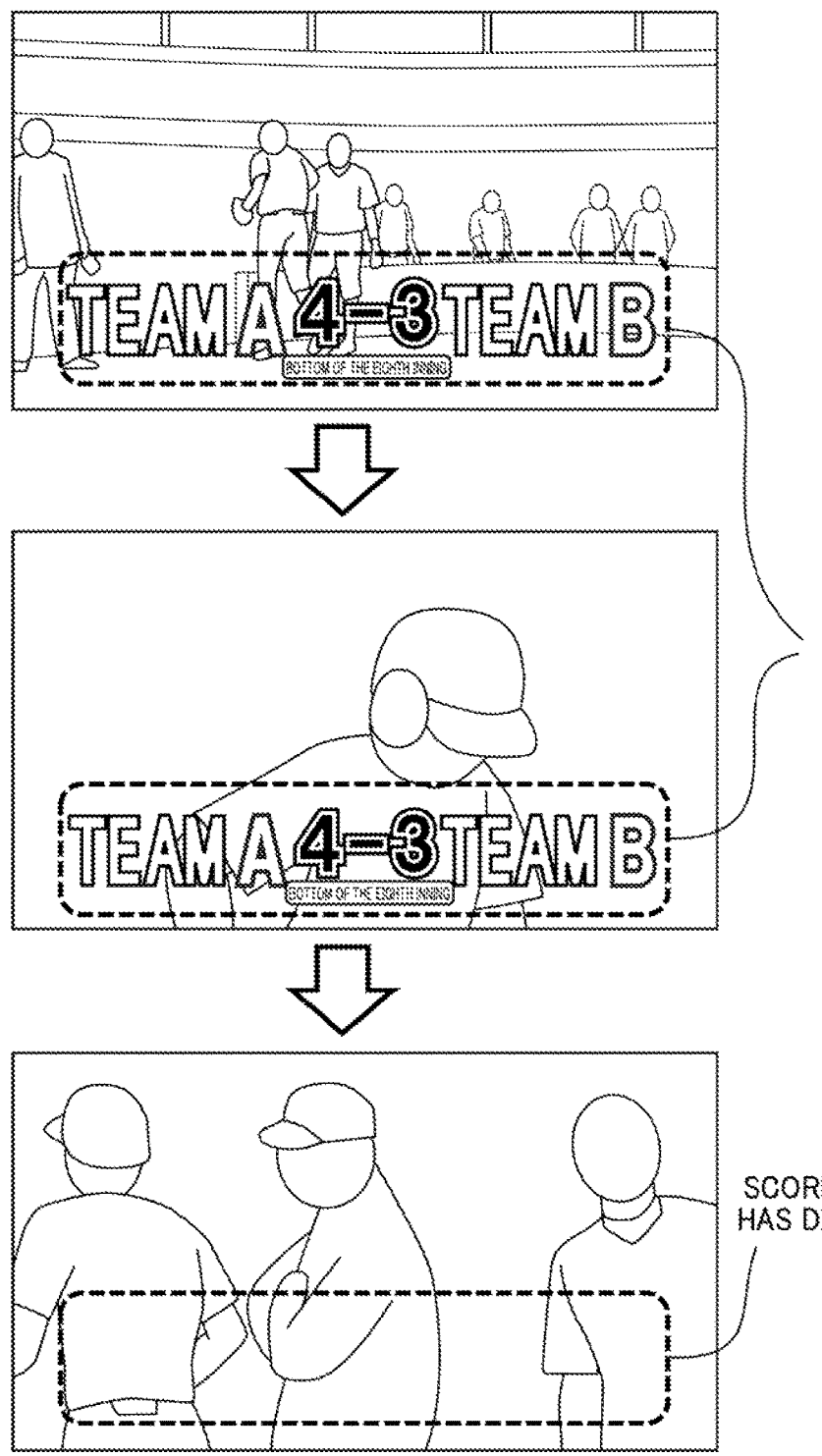
FIG. 13 is a diagram illustrating an example of cut transitions and a score overlay in a run-scoring scene.

In cases in which run scoring occurred at a turn at bat, the second extraction section 24 extracts a cut transition point after the score overlay 101 has disappeared as the end of the turn at bat. In cases of run scoring, the cut transitioning circumstances also change according to the run scoring circumstances, and so the score overlay 101 is used as a clue for deciding the end of the turn at bat. For example, as illustrated in FIG. 13, the score overlay 101 tends to be displayed together with a runner reaching the home plate, and then disappears after plural cut transitions. Accordingly, by including at least footage during which the score overlay 101 is displayed in the footage of the turn at bat in which run scoring occurred, it is possible to avoid giving the impression of the footage of the turn at bat being cut off partway through.

When information indicating that run scoring occurred is acquired from the metadata, the second extraction section 24 uses pattern matching or the like to extract frames including the score overlay 101 from each of the frames in the segment demarcated by the turn at bat tags. The second extraction section 24 detects cut transition points from frames that come after the extracted group of frames that include the score overlay 101. The detection method for the cut transition points is similar to that described above for cases in which no runs are scored. The second extraction section 24 extracts the last frame of the cut prior to transition at the earliest detected transition point that comes after the group of frames including the score overlay 101 as the frame representing the end of the turn at bat.

Note that there is no limitation to the earliest cut transition point to come after the group of frames including the score overlay 101, and a point after a specific number of cut transitions after the group of frames including the score overlay 101 may be extracted as the end of the turn at bat. For example, the specific number may be set higher (for example, 2 times) if the inclusion of scenes showing the reaction on the bench or in the stands following run scoring is desired in the footage of the turn at bat. Moreover, in cases in which there is no need to include run scoring scenes in the footage of the turn at bat even when run scoring occurs, a transition point of a number of cuts corresponding to the turn at bat outcome may be extracted as the end of the turn at bat, similarly to in cases in which no runs are scored, as described above.

The generation section 25 generates metadata indicating the start of a pitch, metadata indicating the start of a turn at bat, and metadata indicating the end of a turn at bat. Specifically, the generation section 25 generates metadata that associates notation indicating the start of a pitch with the frame times of frames indicating the start of a pitch that have been extracted by the first extraction section 21. Similarly, the generation section 25 generates metadata that associates notation indicating the start of a turn at bat with the frame times of frames indicating the start of a turn at bat that have been extracted by the first extraction section 21. Similarly, the generation section 25 also generates metadata that associates notation indicating the end of a turn at bat with the frame times of frames indicating the end of a turn at bat that have been extracted by the second extraction section 24.

The generation section 25 also generates a metadata file that records the plural generated metadata, and associated metadata from the baseball data DB 51, in the sequence of the corresponding frame times. The metadata file may be generated as a file formatted as, for example, a csv (comma-separated values) file. An example of a metadata file is illustrated in FIG. 14. In the example of FIG. 14, each row represents a single item of metadata, and each item of metadata includes a frame time 131. Each item of metadata also includes at least one out of notation 132 indicating the start of a pitch, notation 133 indicating the start or end of a turn at bat, and associated information (text data 134) for each turn at bat from the baseball data DB 51.

The generation section 25 appends the generated metadata file to the edited footage, and transmits the metadata appended footage to the distribution device 30.

When the metadata appended footage is converted to distribution footage by the distribution device 30 and distributed to the user terminal 40, the user terminal 40 displays a distribution screen 120 like that illustrated in FIG. 15 for example. The distribution screen 120 includes a search region 121 for searching for footage of turn at bats the user wants to watch, a listing display region 122 for displaying a list of search results, and a footage playback region 123 for playing back footage.

The search region 121 displays, for example, a textbox for performing searches for specified batter names, and check-boxes by turn at bat result for searching for selected turn at bat results. Note that display of the search region 121 is not limited to this example, and it is sufficient that it is a display that enables setting of search conditions employing metadata appended to the distribution footage, chiefly the associated information (text data 134) for each turn at bat from the baseball data DB 51.

Using the search conditions set by the search region 121 as a key, the listing display region 122 displays a list of frames representing the starts of turns at bat, identified by the frame times extracted by searching the metadata appended to the distribution footage. The list may, for example, include thumbnail images of frames identified by their extracted frame times, and information associated with the extracted frame time for each turn at bat.

The footage playback region 123 plays back footage expressed by a group of frames running from the frame corresponding to a selected thumbnail image in the listing display region 122, namely a frame representing the start of a turn at bat, until a frame representing the end of the turn at bat corresponding to the start of at bat turn frame. Note that the frame representing the end of the turn at bat corresponding to the frame representing the start of the turn at bat is the frame that is appended with the metadata indicating the end of the turn at bat, that is also the frame that is first to appear after the frame representing the start of the selected turn at bat. When metadata is generated in which the frames representing the start and end of a single turn at bat are paired together, the frame representing the start of the selected turn at bat and the paired frame representing the end of the turn at bat may be specified.

Figure 16:
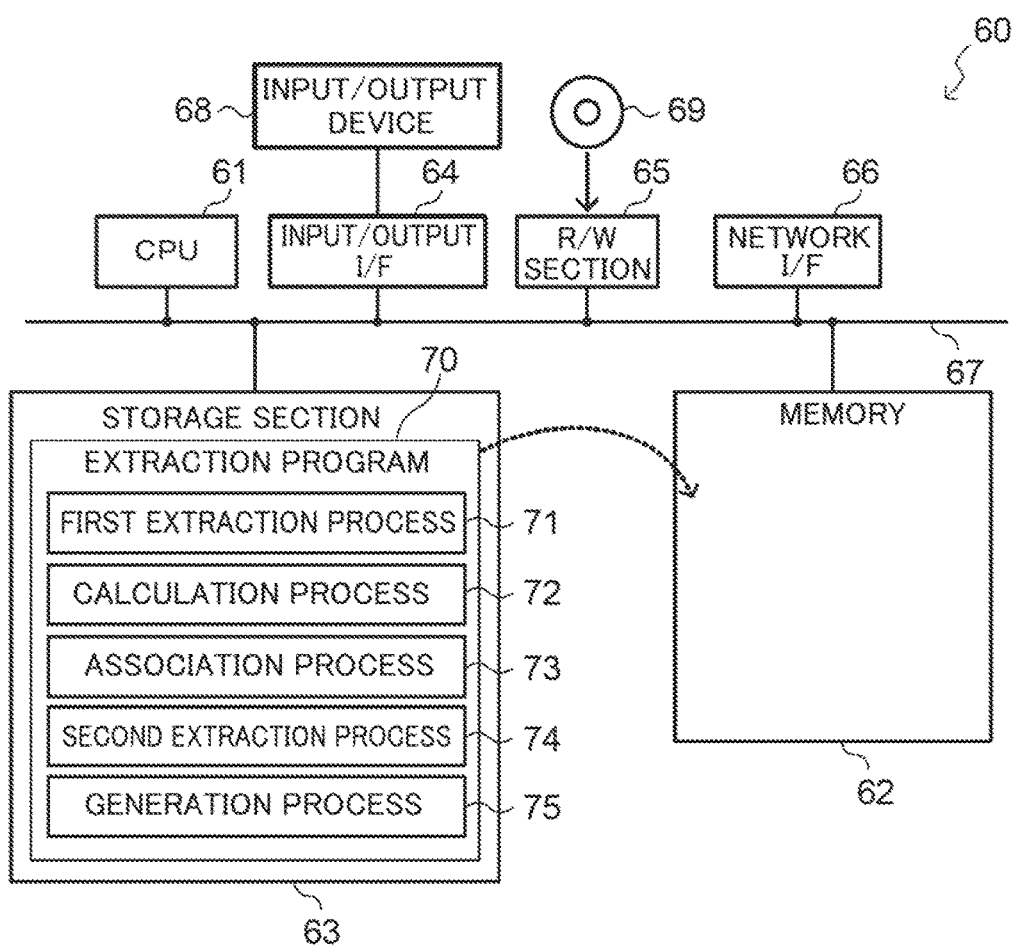
FIG. 16 is a schematic block diagram illustrating an example of a computer that functions as an extraction device.
Figure 17:
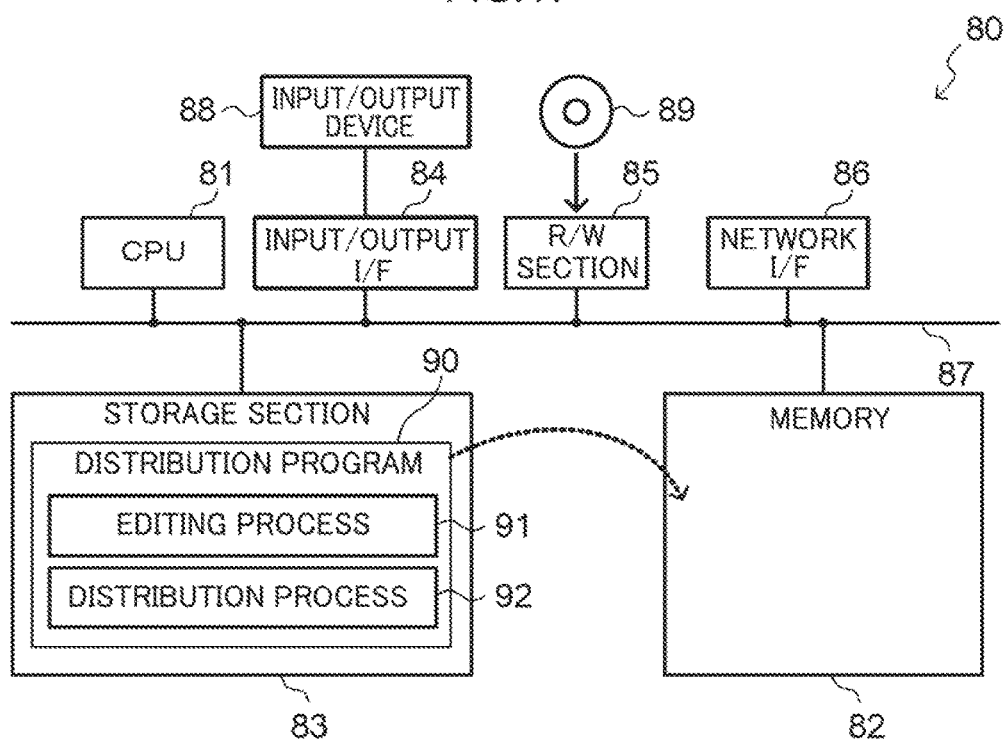
FIG. 17 is a schematic block diagram illustrating an example of a computer that functions as a distribution device.
Figure 18:
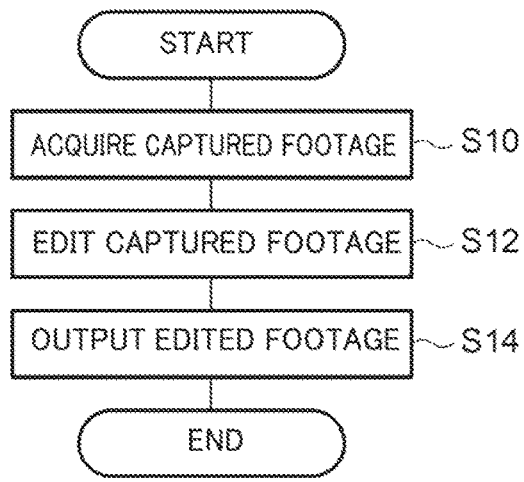
FIG. 18 is a flowchart illustrating an example of editing processing.

The extraction device 20 may, for example, be implemented by a computer 60 illustrated in FIG. 16. The computer 60 includes a CPU 61, memory 62 serving as a temporary storage region, and a nonvolatile storage section 63. The computer 60 also includes an input/output interface (I/F) 64 connected to an input/output device 68 such as a display device or an input device. The computer 60 also includes a read/write (R/W) section 65 that controls reading and writing of data from and to a recording medium 69, and a network I/F 66 for connecting to a network such as the internet. The CPU 61, the memory 62, the storage section 63, the input/output I/F 64, the R/W section 65, and the network I/F 66 are connected to one another through a bus 67.

The storage section 63 may be implemented by a hard disk drive (HDD), solid state drive (SSD), flash memory, or the like. The storage section 63, serving as a storage medium, is stored with an association program 70 that causes the computer 60 to function as the extraction device 20. The CPU 61 reads the association program 70 from the storage section 63, expands the association program 70 into the memory 62, and sequentially executes processes of the association program 70.

The extraction program 70 includes a first extraction process 71, a calculation process 72, an association process 73, second extraction process 74, and generation process 75. The CPU 61 operates as the first extraction section 21 illustrated in FIG. 3 by executing the first extraction process 71. The CPU 61 operates as the calculation section 22 illustrated in FIG. 3 by executing the calculation process 72. The CPU 61 operates as the association section 23 illustrated in FIG. 3 by executing the association process 73. The CPU 61 operates as the second extraction section 24 illustrated in FIG. 3 by executing the second extraction process 71. The CPU 61 operates as the generation section 25 illustrated in FIG. 3 by executing the generation process 75. The computer 60 that executes the extraction program 70 thereby functions as the extraction device 20.

The distribution device 30 may be implemented by, for example, a computer 80 illustrated in FIG. 12. The computer 80 includes a CPU 81, memory 82, a nonvolatile storage section 83, and an input/output I/F 84 connected to an input/output device 88. The computer 80 also includes an R/W section 85 that controls reading and writing of data to and from a recording medium 89, and a network I/F 86 for connecting to a network such as the internet. The CPU 81, the memory 82, the storage section 83, the input/output I/F 84, the R/W section 85, and the network I/F 86 are connected to one another through a bus 87.

The computer 80 that implements the distribution device 30 and the computer 60 that implements the extraction device 20 are connected through the network I/F 86 of the computer 80, the network, and the network I/F 66 of the computer 60.

The storage section 83 may be implemented by a HDD, an SSD, flash memory, or the like. The storage section 83, serving as a storage medium, is stored with a distribution program 90 that causes the computer 80 to function as the distribution device 30. The CPU 81 reads the distribution program 90 from the storage section 83, expands the distribution program 90 into the memory 82, and sequentially executes processes included in the distribution program 90.

The distribution program 90 includes an editing process 91, and a distribution process 92. The CPU 81 operates as the editing section 31 illustrated in FIG. 3 by executing the editing process 91. Moreover, the CPU 81 operates as the distribution section 32 illustrated in FIG. 3 by executing the distribution process 92. Thus the computer 80 executing the distribution program 90 functions as the distribution device 30.

Note that the extraction device 20 and the distribution device 30 can respectively be implemented by, for example, a semiconductor integrated circuit, more specifically, by an application specific integrated circuit (ASIC), or the like.

Next, explanation is given regarding operation of the footage distribution system 10 according to the present exemplary embodiment. When the captured footage is input to the distribution device 30, the distribution device 30 executes editing processing illustrated in FIG. 13, and outputs the edited footage. Next, when the edited footage is input to the association device 20, the extraction device 20 executes extraction processing illustrated in FIG. 19, and outputs the metadata appended footage. Then, when the metadata appended footage is input to the distribution device 30, the distribution device 30 executes distribution processing illustrated in FIG. 21, and outputs the distribution footage. Each processing is described in detail below.

First, at step S10 of the editing processing illustrated in FIG. 13, the editing section 31 acquires the captured footage. Next, at step S12, the editing section 31 applies editing commands, designated by the operation of an operator using the input/output device 68, to the captured footage using image processing. Next, at step S14, the editing section 31 transmits the edited footage to the association device 20, and the editing processing ends.

Figure 19:
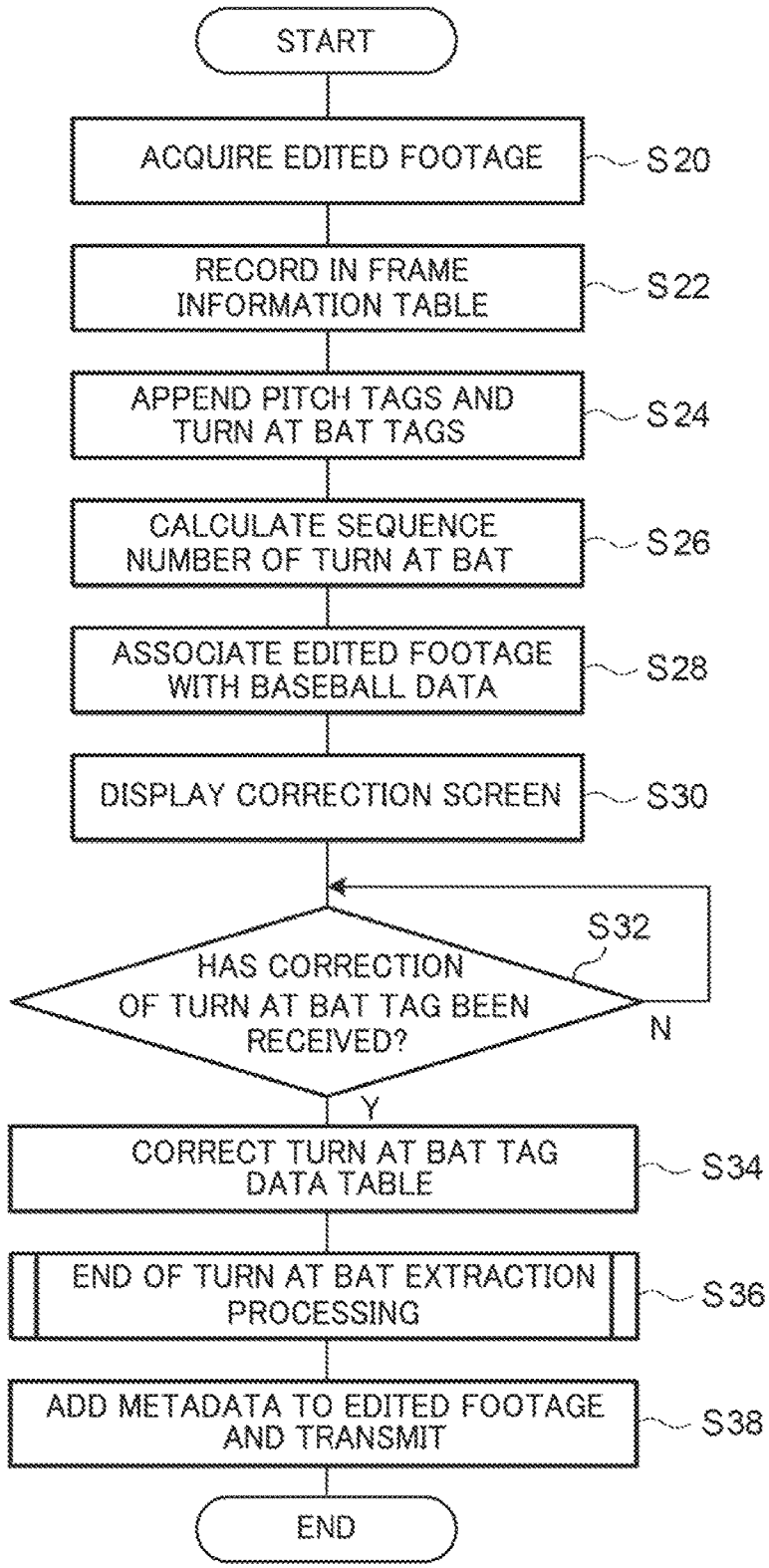
FIG. 19 is a flowchart illustrating an example of extraction processing.

Next, at step S20 of the association processing illustrated in FIG. 19, the first extraction section 21 acquires the edited footage transmitted from the distribution device 30.

Next, at step S22, the first extraction section 21 detects as pitching composition frames, frames having a composition captured at the camera angle employed in pitchers' pitching scenes from each of the plural frames included in the edited footage. The first extraction section 21 extracts the count display 102 from each frame, and detects the count information displayed by the count display 102. The first extraction section 21 records the detection result of the pitching composition frames, and the count information detected for each of the frames, in the frame information table 26.

Next, at step S24, the first extraction section 21 references the frame information table 26 and identifies a group of frames formed from plural consecutive pitching composition frames as a pitching composition scene. Then, the start frame of the pitching composition scene is determined to be the frame representing the start of the pitch, and is appended with the pitch tag indicating the start of a pitch. When the ball count is 0 and the strike count is 0 at the frame indicating the start of the pitch, the first extraction section 21 determines the frame to be a frame representing the start of a turn at bat, and appends the turn at bat tag indicating the start of a turn at bat.

Next, at step S26, the calculation section 22 generates the turn at bat tag data table 27, like that illustrated in FIG. 7 for example, of information extracted from the frame information table 26 for calculating the turn at bat sequence number. The calculation section 22 then calculates the sequence number of the turn at bat that indicates the sequence in which each turn at bat falls in the game for each team, based on the values recorded in each item out of the "inning", "out", "runner", "score (batting first)", "score (batting second)", and "left on base (cumulative)". The calculation section 22 records the turn at bat sequence number calculated for each turn at bat in the "turn at bat event ID" item of the turn at bat tag data table 27.

Next, at step S28, the association section 23 acquires the baseball data DB 51 from the external device 50, and associates the baseball data DB 51 with the turn at bat tag data table 27 based on their respective turn at bat event IDs.

Next, at step S30, the association section 23 presents places where a "turn at bat event ID" value has been skipped over or duplicated in the turn at bat tag data table 27, and displays the correction screen 110, like that illustrated in FIG. 9 for example, to prompt correction of the turn at bat tag.

When a turn at bat event ID is duplicated, the operator of the extraction device 20 presenting the correction screen 110 confirms the footage, and erases the turn at bat data corresponding to the turn at bat tag append error from the associated data display region 112. When a turn at bat event ID has been skipped over, the operator selects the append turn at bat tag button 114 at the place where appending a turn at bat tag is desired, while confirming the footage.

Next, at step S32, the association section 23 determines whether or not a turn at bat tag correction has been received from the operator. When a correction has not been received, the determination of the current step is repeated until a correction is received. When a correction has been received, processing transitions to step S34.

At step S34, the association section 23 erases the turn at bat tag data corresponding to the erased turn at bat data from the turn at bat tag data table 27 in cases in which a request to erase turn at bat data from the associated data display region 112 has been received. The association section 23 adds the frame time of the frame displayed on the footage playback region 111 to the turn at bat tag data table 27 when the append turn at bat tag button 114 is selected in cases in which selection of the append turn at bat tag button 114 is received. The association section 23 then references the turn at bat event IDs associated with the previous and subsequent frame times in the turn at bat tag data table 27, and appends the turn at bat event ID to the added frame time.

When there is no value skipping or duplication of turn at bat event IDs, determination is made that no turn at bat tag append errors are present, and the processing of steps S30 to S34 is skipped.

Figure 20:
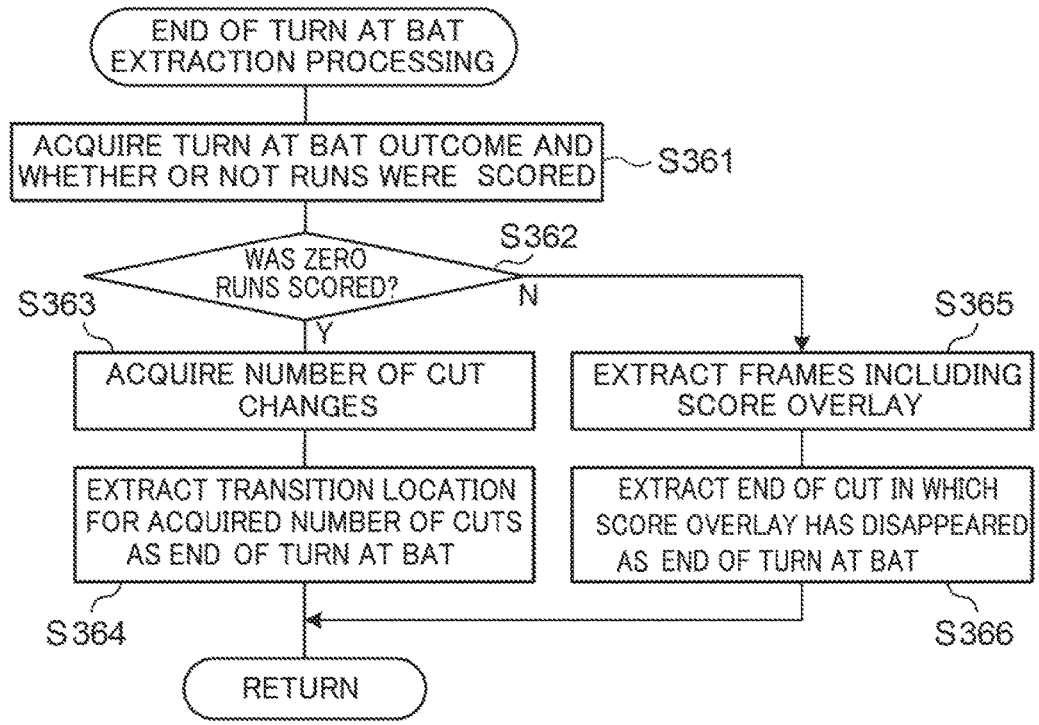
FIG. 20 is a flowchart illustrating an example of end of turn at bat extraction processing.

Next, at step S36, the second extraction section 24 executes end of turn at bat extraction processing, illustrated in detail in FIG. 20, for each segment demarcated by turn at bat tags.

At step S361 of the end of turn at bat extraction processing illustrated in FIG. 20, the second extraction section 24 acquires the turn at bat outcome, and whether or not any runs were scored at that turn at bat, from the metadata indicating data for each turn at bat that is associated with the frames appended with the turn at bat tag, namely the frames representing the starts of turns at bat.

Next, at step S362, based on the acquired information, the second extraction section 24 determines whether or not any runs were scored. When zero runs were scored, processing transitions to step S363, and when run scoring occurred, processing transitions to step S365.

At step S363, the second extraction section 24 acquires the number of cut changes corresponding to the turn at bat outcome acquired from the metadata from the number of cut changes table 28, in which the turn at bat outcomes are associated in advance with numbers of cut changes, for example, as illustrated in FIG. 11.

Next, at step S364, as the frame representing the start of the final pitch of the turn at bat, the second extraction section 24 extracts the frame with the highest frame time out of the frames appended with the pitch tag in the segment demarcated by the turn at bat tags. The second extraction section 24 also detects frames where the cut transitions in sequence from the frame representing the start of the final pitch of that turn at bat, and designates the earliest detected cut transition as the point where the cut including the final pitch of the turn at bat transitions to the next cut. The second extraction section 24 also detects the acquired number of cut changes' worth of cut transition points from the point where the cut including the final pitch of the turn at bat transitions to the next cut onwards. The second extraction section 24 extracts the last frame of the cut prior to the transition of the final detected transition point as the frame representing the end of the turn at bat.

At step S365, the second extraction section 24 extracts frames including the score overlay 101 from each of the frames in the segment demarcated by the turn at bat tags.

Next, at step S366, the second extraction section 24 detects cut transition points from frames that come later than the extracted group of frames including the score overlay 101. The second extraction section 24 also extracts the last frame of the cut prior to the transition of the earliest detected transition point that comes after the group of frames including the score overlay 101 as the frame representing the end of the turn at bat.

When the end of turn at bat extraction processing described above has been completed for every segment demarcated by the turn at bat tags included in the edited footage, processing returns to the extraction processing illustrated in FIG. 19.

Next, at step S38 of the extraction processing illustrated in FIG. 19, the generation section 25 generates metadata indicating the starts of pitches, metadata indicating the starts of turns at bat, and metadata indicating the ends of turns at bat. Next, the generation section 25 generates a metadata file that records the plural generated metadata, and associated metadata from the baseball data DB 51, in the sequence of the corresponding frame times. The generation section 25 also adds the generated metadata file to the edited footage, which the generation section 25 then transmits to the distribution device 30 as metadata-appended footage, and the extraction processing ends.

Figure 21:
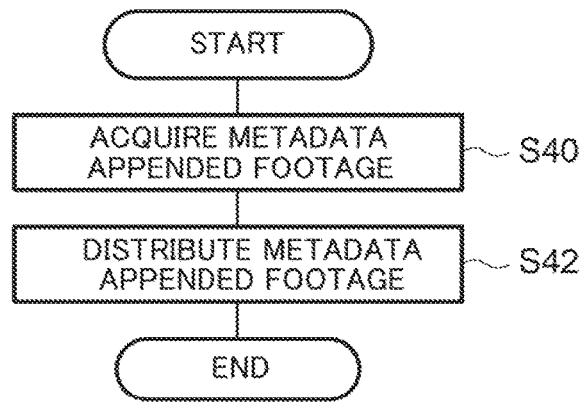
FIG. 21 is a flowchart illustrating an example of distribution processing.

Next, at step S40 of the distribution processing illustrated in FIG. 21, the distribution section 32 acquires the metadata appended footage transmitted from the extraction device 20. Next, at step S42, the distribution section 32 converts the metadata appended footage to distribution footage according to the specified standards, and distributes the distribution footage to the distribution destination user terminal 40, and distribution processing ends.

As described above, for the number of cuts corresponding to the turn at bat outcome associated with the turn at bat represented by the segment, the extraction device 20 according to the present exemplary embodiment detects cut transition points that come after the cut including the final pitch in the segment demarcated by the turn at bat tags that indicate the starts of turns at bat. The detected point is then extracted as the end of the turn at bat. This thereby enables an appropriate point to be extracted as the end of the turn at bat, without cutting off the final portion of the footage for a single turn at bat, and also enables a reduction in excessive lengthiness. Namely, the end of a turn at bat can be extracted from footage of a baseball game with good precision.

In a scene in which run scoring occurred, a cut transition point after the overlay indicating that run scoring has occurred has disappeared is extracted as the end of the turn at bat. This thereby enables an appropriate point to be extracted as the end of the turn at bat, without cutting off the final portion, including the run-scoring scene, of the footage for a single turn at bat, and also enables a reduction in excessive lengthiness, regardless of the nature of the run-scoring scene.

Computing the sequence of the turns at bat, and associating the turn at bat data, this being external data, with good precision, enables turn at bat outcomes to be employed as the turn at bat outcomes used to extract the end of turns at bat with high precision. This thereby enables the ends of turns at bat to be extracted with better precision.

A reduction in excessive lengthiness is enabled when creating digest footage in turn at bat units from the footage to which has been added the metadata based on the ends of turns at bat extracted using the present exemplary embodiment. Moreover, it is possible to set detailed search conditions, and find and view footage of a desired turn at bat, due to adding the metadata that has been associated with external data.

Note that in the present exemplary embodiment, explanation has been given regarding a case in which frames representing the start of turns at bat is extracted from the edited footage, and the turn at bat outcomes are associated from external data. However, points representing starts of turns at bat may be identified in advance, and the extraction device 20 may be input with footage appended with turn at bat outcomes. The first extraction section 21, the calculation section 22, and the association section 23 may be omitted from the extraction device 20 in such cases. The method for identifying the starts of turns at bat and the method for appending the turn at bat outcomes are not limited to the methods described in the present exemplary embodiment, and, for example, extraction and appending may be performed manually.

Although explanation has been given in the exemplary embodiment described above of a case in which a frame captured in the batter-direction from behind the pitcher is considered to be the pitching composition frame, the pitching composition frame is not limited thereto. For example, it is sufficient that the pitching composition frame is a frame captured at a characteristic camera angle employed in pitchers' pitching scenes, such as a frame captured from a camera mounted to the head of the umpire (a frame captured from the umpire in the pitcher-direction).

In the exemplary embodiment described above, explanation has been given regarding a case in which the score overlay is detected after determining whether or not any runs were scored, and the processing to detect the score overlay is performed in cases in which run scoring occurred. However, there is no limitation thereto. For example, the score overlay may be detected in each frame, without determining whether or not any runs were scored. In such cases, when the score overlay is detected, similarly to in the exemplary embodiment described above, a transition point after a specific number of cuts after the score overlay has disappeared may be extracted as the end of the turn at bat.

Although explanation has been given in the exemplary embodiment described above of an example in which the footage distribution system 10 includes a distribution device 30, and an extraction device 20, there is no limitation thereto. Each functional section of the distribution device 30, and each functional section of the extraction device 20 may be implemented by a single computer.

Moreover, the extraction device of the technology disclosed herein is not limited to application to a footage distribution system. For example, configuration may be made such that a footage file stored on an external storage device connected over a network is acquired, and existing external baseball data is associated with the footage file as metadata and stored again in the storage device. Moreover, the extraction device of the technology disclosed herein is also applicable to sports other than baseball, such as softball.

Although explanation has been given above of a mode in which the extraction program 70 is pre-stored (installed) on the storage section 63, and the distribution program 90 is pre-stored (installed) on the storage section 83, provision may be made in a recorded format on a recording medium, such as a CD-ROM, a DVD-ROM, or the like.

When extracting the end of a turn at bat as an event end point in footage of a baseball game, cuts transition in various ways according to the game circumstances, and so it is not possible to extract the end of turns at bat with good precision using only appearance patterns of cut-length types, as in the related technology.

An aspect of technology disclosed herein enables improved precision when extracting the end of a turn at bat from footage of a baseball game.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an extraction program that causes a computer to execute a process, the process comprising:
    acquiring, from a memory, footage of a baseball game that includes a plurality of cuts and in which a first point representing a start of a turn at bat has been associated with information indicating respective outcomes of the turn at bat,
    acquiring, from the memory, a pre-stored association between the respective outcomes of the turn at bat and a number of cut changes;
    determining, from an outcome of the turn at bat, the predetermined number of cut changes based on the pre-stored association; and
    extracting a number of cut changes after a cut including a final pitch scene in the turn at bat such that the extracted number of cut changes equals the predetermined number of cut changes and setting the final extracted cut change as a second point representing an end of a turn at bat.

2. The non-transitory computer-readable recording medium of claim 1, wherein in the process, in cases in which the outcome of the turn at bat indicates that run scoring has occurred, extracting, as the end of the turn at bat, a point that is subsequent to disappearance of a display indicating that run scoring has occurred and that is a point prior to which cuts have transitioned a specific number of times.

3. A non-transitory computer-readable recording medium storing an extraction program that causes a computer to execute a process, the process comprising:
    extracting, from footage of a baseball game that includes a plurality of cuts, a temporary display that indicates that a scoring run has occurred in a turn at bat and that is displayed temporarily within a cut in the footage corresponding to the turn at bat;
    acquiring, from a memory, a pre-stored association between respective outcomes of the turn at bat and a number of cut changes;
    determining, from an outcome of the turn at bat, a predetermined number of cut changes based on the pre-stored association; and
    extracting a predetermined number of cut changes after a disappearance of the temporary display and setting the final extracted cut change as a point representing an end of a turn at bat.

4. An extraction method, comprising:
    by a processor, acquiring, from a memory, footage of a baseball game that includes a plurality of cuts and in which a first point representing a start of a turn at bat has been associated with information indicating respective outcomes of the turn at bat,
    acquiring, from the memory, a pre-stored association between the respective outcomes of the turn at bat and number of cut changes;
    determining, from an outcome of the turn at bat, the predetermined number of cut changes based on the pre-stored association; and
    extracting a number of cut changes after a cut including a final pitch scene in the turn at bat such that the extracted number of cut changes equals the predetermined number of cut changes and setting the final extracted cut change as a second point representing an end of a turn at bat.

5. An extraction method, comprising:
    by a processor, extracting, from footage of a baseball game that includes a plurality of cuts, a temporary display that indicates that a scoring run has occurred in a turn at bat and that is displayed temporarily within a cut in the footage corresponding to the turn at bat;
    acquiring, from a memory, a pre-stored association between respective outcomes of a turn at bat and a number of cut changes;

determining, from an outcome of the turn at bat, a predetermined number of cut changes based on the pre-stored association; and extracting a predetermined number of cut changes after disappearance of the temporary display and setting the final extracted cut change as a point representing an end of a turn at bat.

6. An extraction device, comprising:

a memory; and a processor coupled to the memory, the process configured to:
- acquire, from the memory, footage of a baseball game that includes a plurality of cuts and in which a first point representing a start of a turn at bat has been associated with information indicating respective outcomes of the turn at bat,
- acquire, from the memory, a pre-stored association between the respective outcomes of the turn at bat and number of cut changes;
- determine, from an outcome of the turn at bat, the predetermined number of cut changes based on the pre-stored association; and
- extract a number of cut changes after a cut including a final pitch scene in the turn at bat such that the extracted number of cut changes equals the predetermined number of cut changes and setting the final extracted cut change as a second point representing an end of a turn at bat.

7. An extraction device, comprising:

a memory; and a processor coupled to the memory, the process configured to:
- extract, from footage of a baseball game that includes a plurality of cuts, a temporary display that indicates that a scoring run has occurred in a turn at bat and that is displayed temporarily within a cut in the footage corresponding to the turn at bat;
- acquire, from the memory, a pre-stored association between respective outcomes of the turn at bat and a number of cut changes;
- determine, from an outcome of the turn at bat, a predetermined number of cut changes based on the pre-stored association; and
- extract a predetermined number of cut changes after disappearance of the temporary display and setting the final extracted cut change as a point representing an end of a turn at bat.

* * * * *